(12) United States Patent
Mishra

(10) Patent No.: US 11,884,794 B2
(45) Date of Patent: Jan. 30, 2024

(54) POURABLE POLYURETHANE FOAM WITH ENERGY ATTENUATING PROPERTIES

(71) Applicant: Bell Textron Inc., Fort Worth, TX (US)

(72) Inventor: Suvankar Mishra, Carrollton, TX (US)

(73) Assignee: Textron Innovations Inc., Providence, RI (US)

( * ) Notice: Subject to any disclaimer, the term of this patent is extended or adjusted under 35 U.S.C. 154(b) by 476 days.

(21) Appl. No.: 17/068,078

(22) Filed: Oct. 12, 2020

(65) Prior Publication Data

US 2022/0112354 A1    Apr. 14, 2022

(51) Int. Cl.
| | |
|---|---|
| *C08K 3/30* | (2006.01) |
| *B64C 7/00* | (2006.01) |
| *C08J 9/02* | (2006.01) |
| *C08G 18/76* | (2006.01) |
| *C08G 18/08* | (2006.01) |
| *C08G 18/40* | (2006.01) |
| *C08G 101/00* | (2006.01) |

(52) U.S. Cl.
CPC .................. *C08K 3/30* (2013.01); *B64C 7/00* (2013.01); *C08G 18/14* (2013.01); *C08G 18/40* (2013.01); *C08G 18/7685* (2013.01); *C08J 9/02* (2013.01); *C08G 2101/00* (2013.01); *C08J 2375/04* (2013.01); *C08K 2003/3045* (2013.01)

(58) Field of Classification Search
None
See application file for complete search history.

(56) References Cited

FOREIGN PATENT DOCUMENTS

CA    2771376 A1 *  4/2011   ........... B32B 15/046

* cited by examiner

*Primary Examiner* — Jeffrey D Washville
(74) *Attorney, Agent, or Firm* — Fogarty LLP

(57) ABSTRACT

Embodiments are directed to a pourable foam comprising a first resin component comprising a polymeric methylene diphenyl diisocyanate, a second resin component comprising a polyol, and a barium sulfate powder component. The barium sulfate powder component is combined with the second resin component prior to combining the first and second resin components. The barium sulfate component may comprise between 1% and 50% of the pourable foam. The pourable foam may be used to repair or create aircraft components.

20 Claims, 13 Drawing Sheets

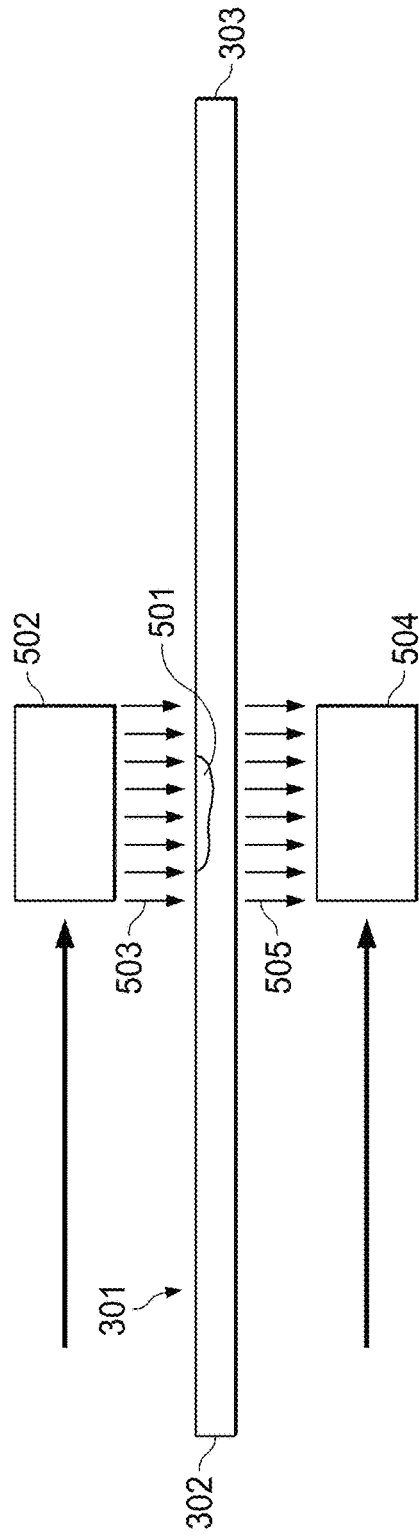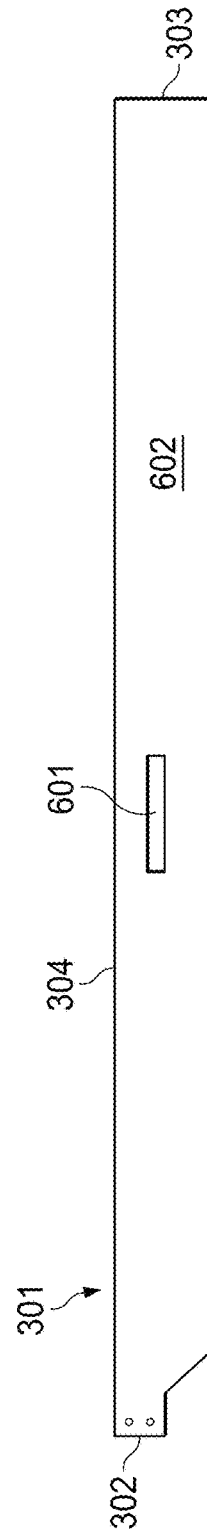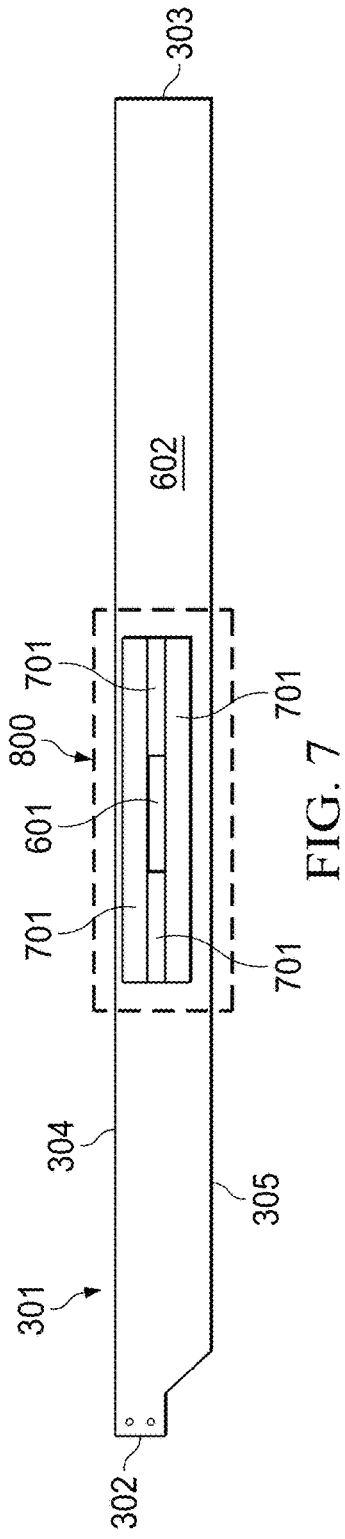

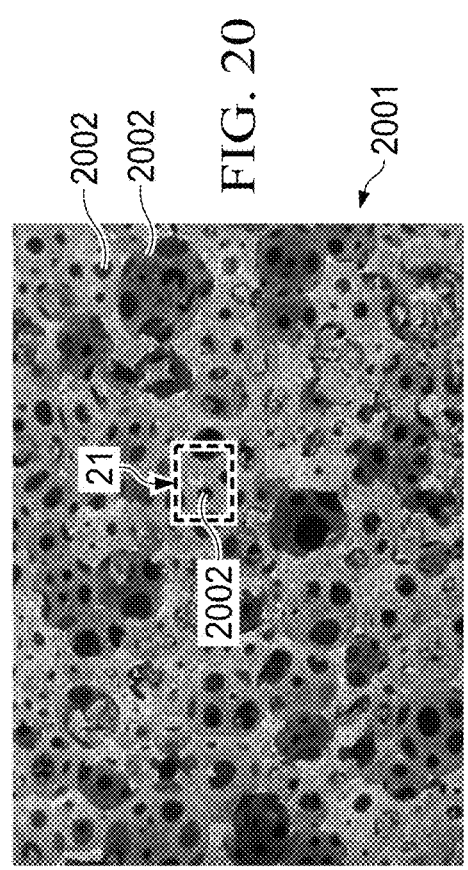
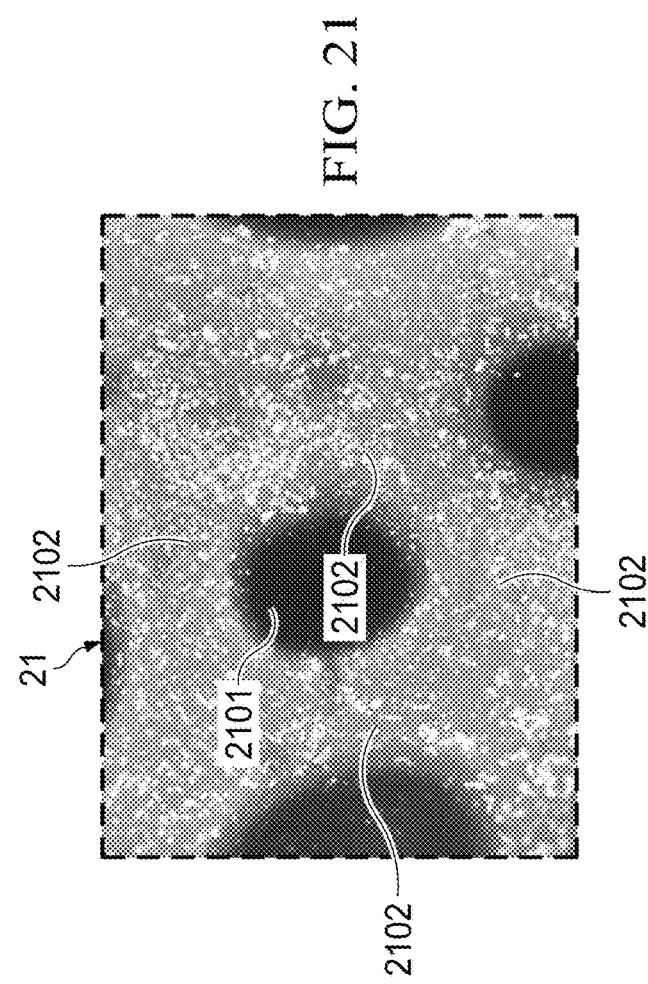
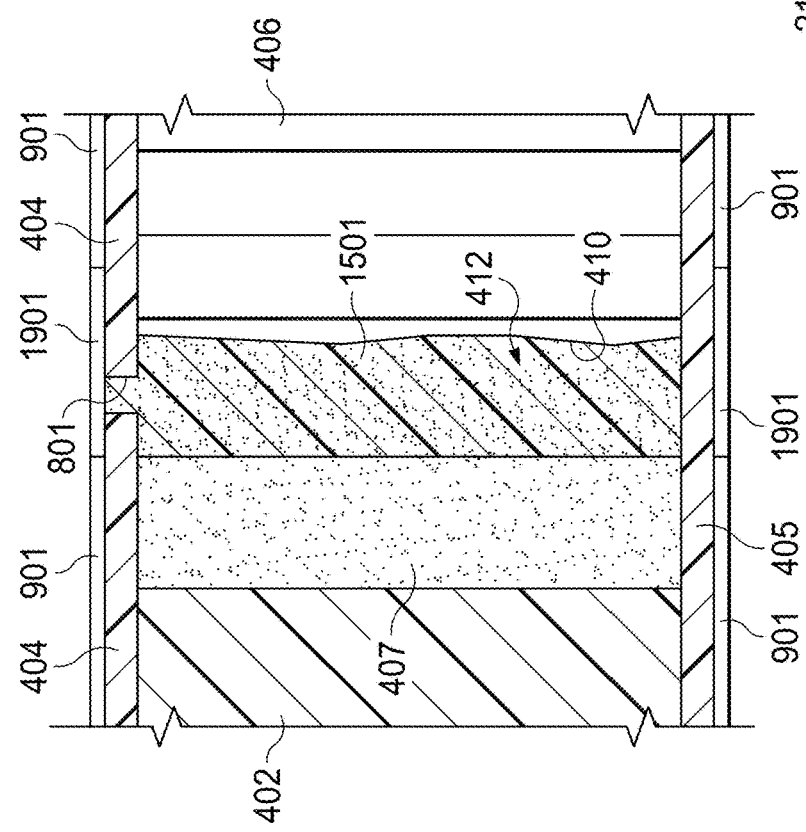

POURABLE POLYURETHANE FOAM WITH ENERGY ATTENUATING PROPERTIES

BACKGROUND

There are numerous considerations involved in the design and manufacture of components for aircraft, such as tiltrotor aircraft and rotorcraft, including size, weight, power efficiency, fuel efficiency, noise, vibration, structural loads, and so forth. For example, manufacturing processes for rotor blades is often extremely challenging and can implicate numerous considerations which may impact the ability to manufacture rotor blades in a cost and/or time efficient manner. Many components of modern aircraft are constructed using composite structures. Some composite structures are constructed using a plurality of pre-constructed subassemblies. In some cases, the dimensions of the subassemblies must conform to prescribed tolerances for the composite structure to perform in accordance with established performance guidelines. Existing systems use rigid foams, for example, which require machining and an added layer of film adhesive for bonding the foam to aircraft skin. The rigid foam systems must be spliced in order to make parts with complex contours.

Improving crash-worthiness and resistance to inflight damage, such as bird strikes, are ongoing challenges for aircraft manufacturers. The aircraft components must be strong enough to maintain structural integrity while being able to deform so that the component does not break and so that injurious loads are not transmitted to occupants. A goal is to have aircraft components stay in place and retain their shape in the event of inflight or ground impact. In existing systems, metals that absorb energy through plastic deformation have been utilized in attempts to provide crashworthy structures. More recently, composite materials, such as fiber reinforced plastic materials, are often used for the construction of airframes. Composite materials are used because of reduced cost, reduced weight, and improved corrosion resistance. However, such composite materials are not characterized by having plasticity and, therefore, must absorb energy by other means.

SUMMARY

In one aspect, embodiments are directed to a pourable foam comprising a first resin component comprising a polymeric methylene diphenyl diisocyanate, a second resin component comprising a polyol, and a barium sulfate powder component. The barium sulfate powder component is combined with the second resin component prior to combining the first and second resin components. The barium sulfate component may comprise between 1% and 50% of the pourable foam. In one embodiment, the barium sulfate component comprises 16% of the pourable foam. In another embodiment, the barium sulfate component comprises 50% of the pourable foam.

In a further embodiment, a method for preparing a pourable foam comprises combining a barium sulfate powder component with a first resin component, wherein the first resin component comprises a polyol, and mixing the combination of the first resin component and the barium sulfate powder with a second resin component to create the pourable foam, wherein the second resin component comprises a polymeric methylene diphenyl diisocyanate. In one method, the barium sulfate component may comprise between 10% and 20% of the pourable foam. In another method, the barium sulfate component may comprise between 45% and 55% of the pourable foam.

The method may further comprise depositing the pourable foam in a void space in a composite component and allowing the pourable foam to cure in the void space.

The method may further comprise depositing the pourable foam in a mold, allowing the pourable foam to form a blank shape in the mold, and machining the blank shape into a product component. The product component may comprise, for example, a component of an aircraft fuselage, main rotor, tail rotor, propeller, ducted fan blade or propeller, wing, an aircraft nose cone, or an aircraft seat.

In another embodiment, a method of repairing a composite structure comprises providing an assembled composite structure having a substantially rigid outer component, wherein the composite structure comprises a void space at least partially bounded by the outer component, forming an injection hole through the outer component to provide a path between the void space and space external to the composite structure, injecting a foam into the void space through the injection hole while the foam is in a substantially unexpanded state, wherein the foam comprises a two-part resin mixture having a barium sulfate powder additive, and expanding the foam within the void space. The composite structure may comprise a rotor blade. The void space may be disposed between a spar of the rotor blade and a honeycomb structure of the rotor blade. The outer component may comprise a skin of the rotor blade.

The method may further comprise, prior to forming the injection hole, performing a nondestructive evaluation of the composite structure to identify the void space.

The method may further comprise applying masking tape to the composite structure around an area of the outer component identified as being associated with an identified void space, and wherein the forming the injection hole is conducted after applying the masking tape.

The method may further comprise, wherein the void space is disposed between an area of the outer component identified as being associated with the void space and an area of an opposing outer component, removing paint from the area of the outer component identified as being associated with the void space the area of the opposing outer component.

The method may further comprise passing light through the composite component along a path through the area of the opposing outer component, the void space, and the area of the outer component identified as being associated with the void space; and capturing an image of the light passed through the composite component before injecting the foam.

The method may further comprise passing light through the composite component along a path through the area of the opposing outer component, the void space, and the area of the outer component identified as being associated with the void space; and capturing an image of the light passed through the composite component after the foam is injected and expanded.

The method may further comprise forming a relief hole through at least one of the outer components and another outer component that at least partially bounds the void space.

In another embodiment, a component comprises a composite structure disposed between an upper skin and a lower skin, a void region between the upper skin and the lower skin, and an energy attenuating foam substantially filling the void region. The energy attenuating foam comprises a first resin component, a second resin component, and a barium sulfate component, wherein energy attenuating properties of the foam are controlled by a proportion of the barium sulfate component in the foam. The energy attenuating foam may comprise a pourable foam or an injectable foam that expands to fill the void region.

A percentage of the barium sulfate component within the energy attenuating foam determines a porosity of the energy attenuating foam. The percentage of the barium sulfate component within the energy attenuating foam also determines a homogeneousness of the energy attenuating foam.

The percentage of the barium sulfate component within the energy attenuating foam determines a foam cell size within the energy attenuating foam, wherein the cell size determines the energy attenuating properties of the foam.

The proportion of the barium sulfate component in the energy attenuating foam may be selected to create a foam cell size of different sizes, such as cell sizes in the range of 0.010 to 0.017 inches, or in the range of 0.006 to 0.012 inches.

The component may be an aircraft part, such as one or more of an aircraft fuselage, main rotor, tail rotor, propeller, ducted fan blade or propeller, wing, an aircraft nose cone, and an aircraft seat.

BRIEF DESCRIPTION OF THE DRAWINGS

Figure 1A:
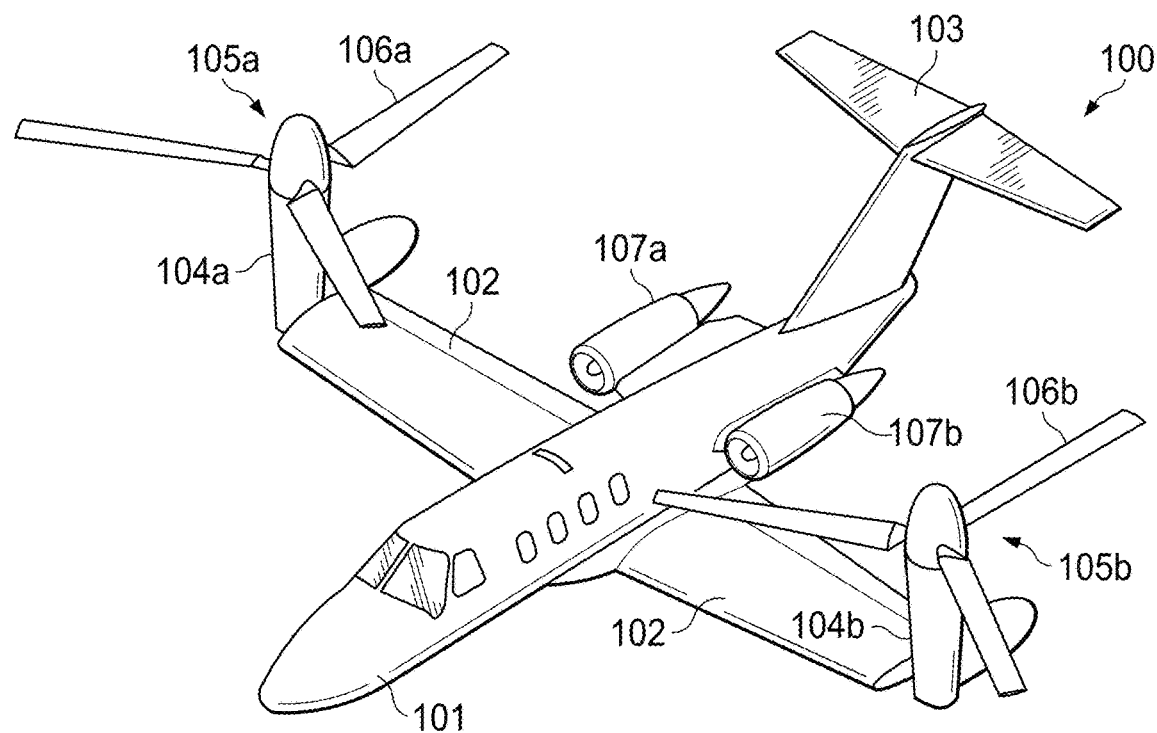
Figure 1B:
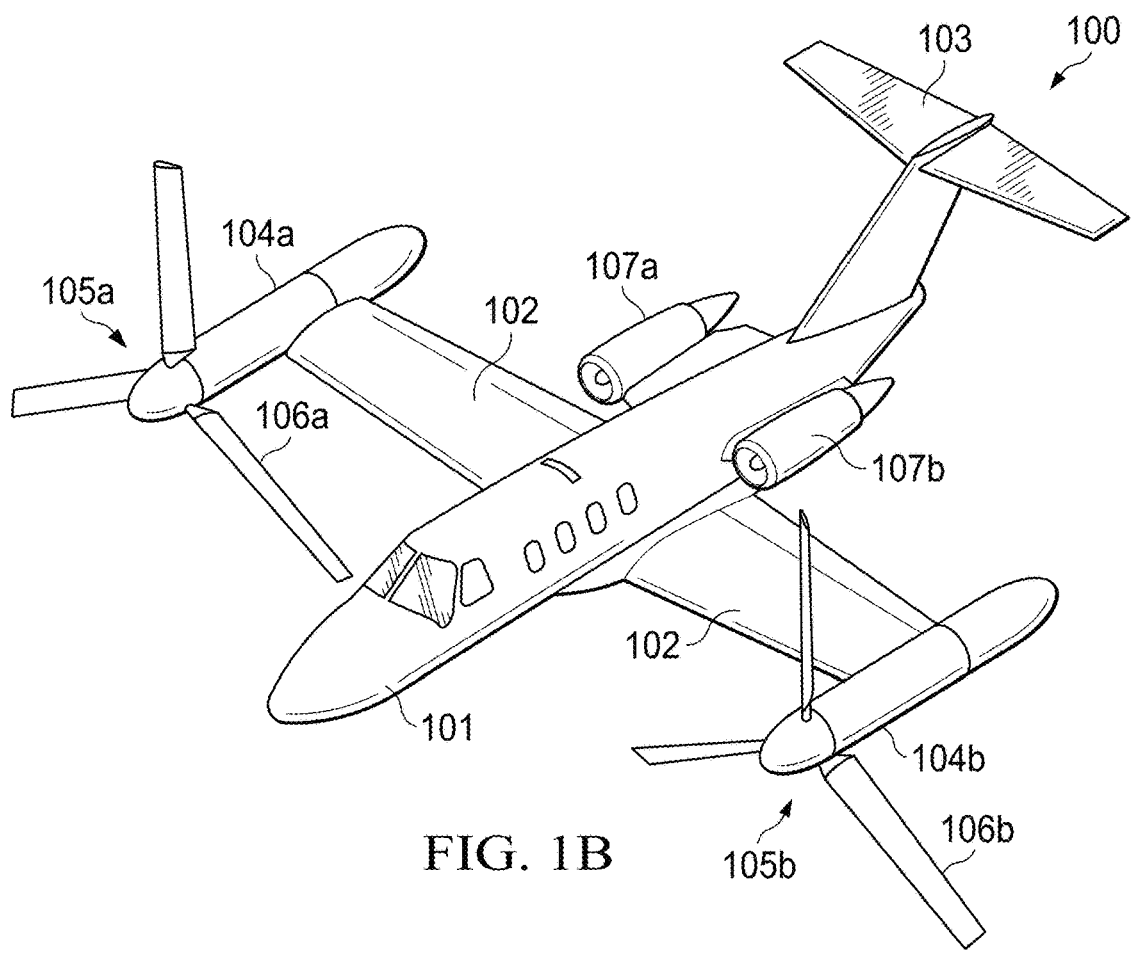
Figure 1C:
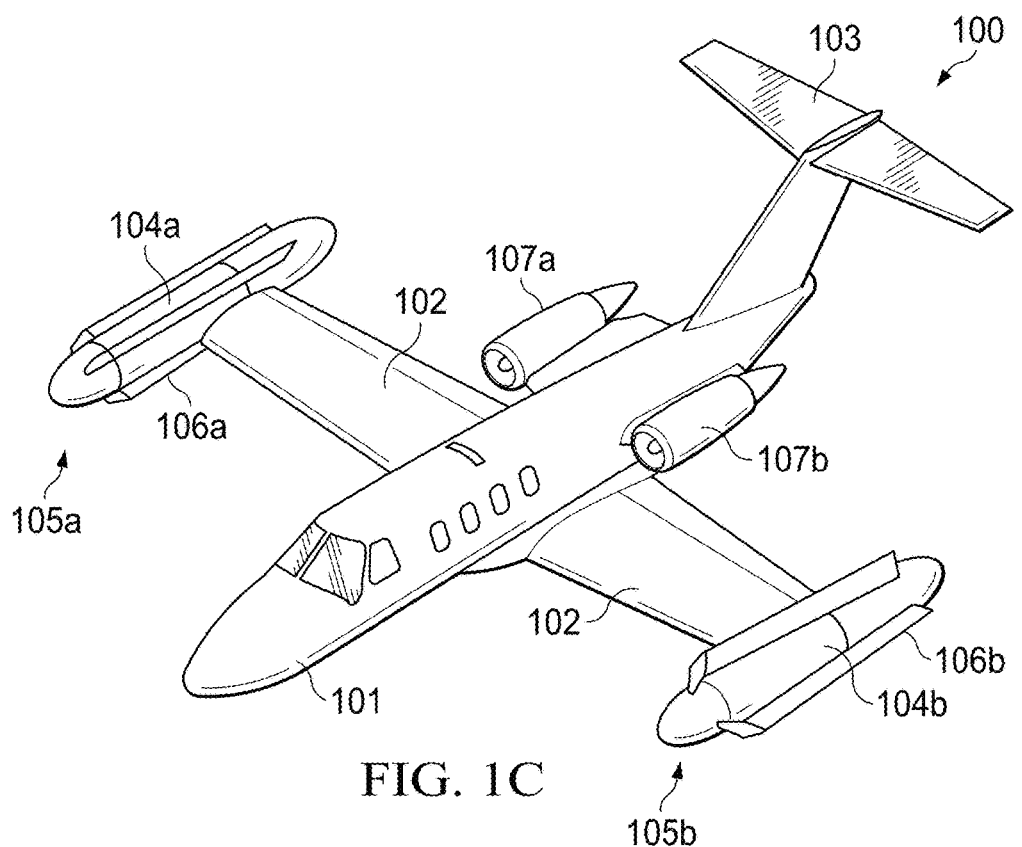

Having thus described the invention in general terms, reference will now be made to the accompanying drawings, which are not necessarily drawn to scale, and wherein:

FIGS. 1A-1C are simplified schematic diagrams of an example tiltrotor aircraft, in accordance with certain embodiments.

Figure 2:
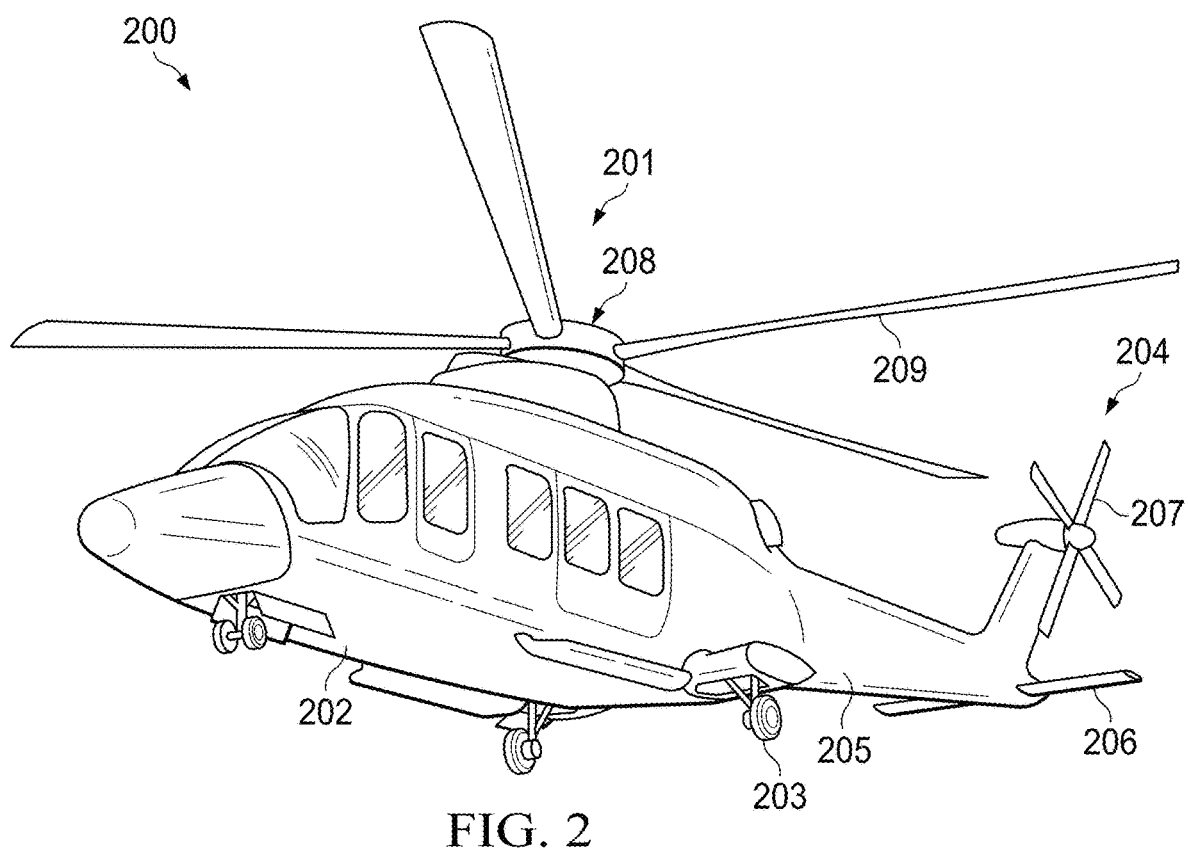

FIG. 2 is simplified schematic diagram of an example rotorcraft aircraft, in accordance with certain embodiments.

Figure 3A:
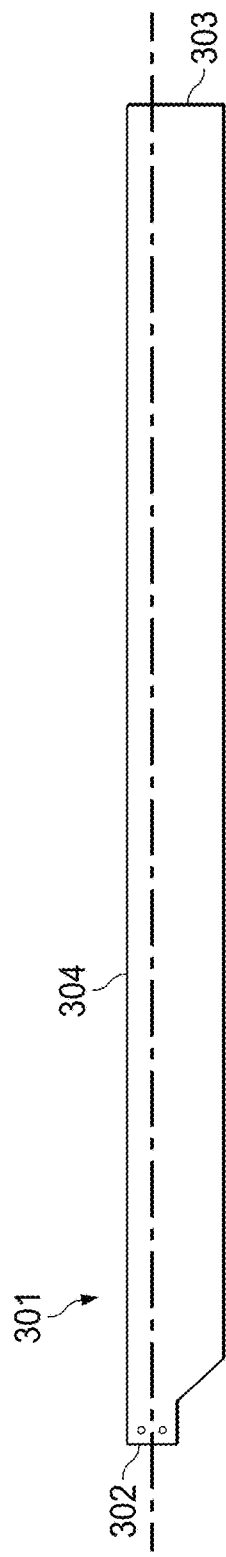

FIG. 3A is a top view of a rotor blade of the helicopter of FIG. 2.

Figure 3B:
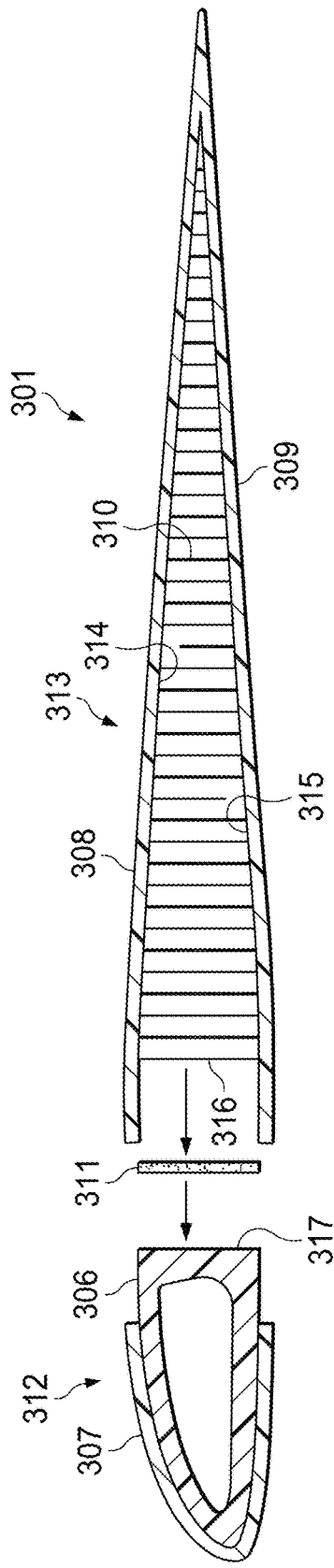

FIG. 3B is a cross-sectional view of the rotor blade of FIG. 3A in an unassembled state.

Figure 3C:
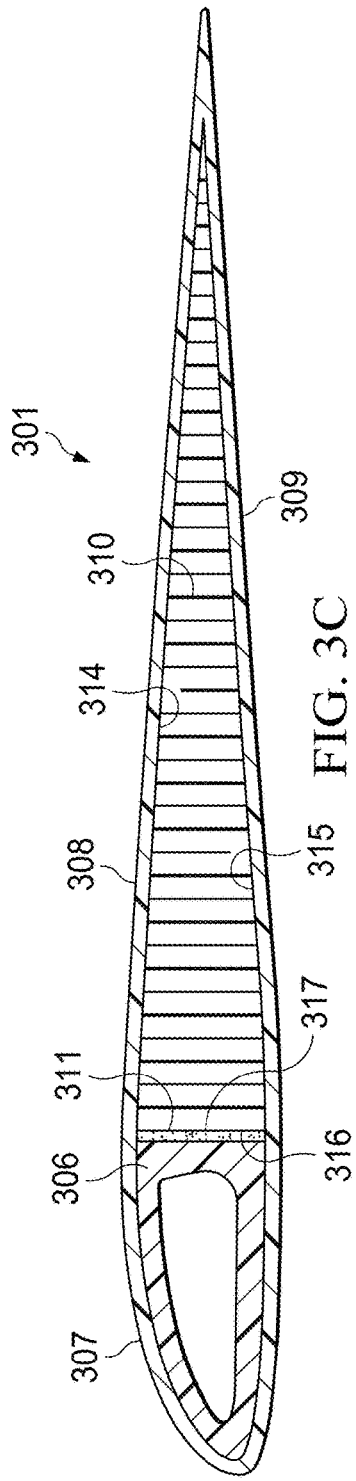

FIG. 3C is a cross-sectional view of the rotor blade of FIG. 3B in an assembled state.

Figure 4A:
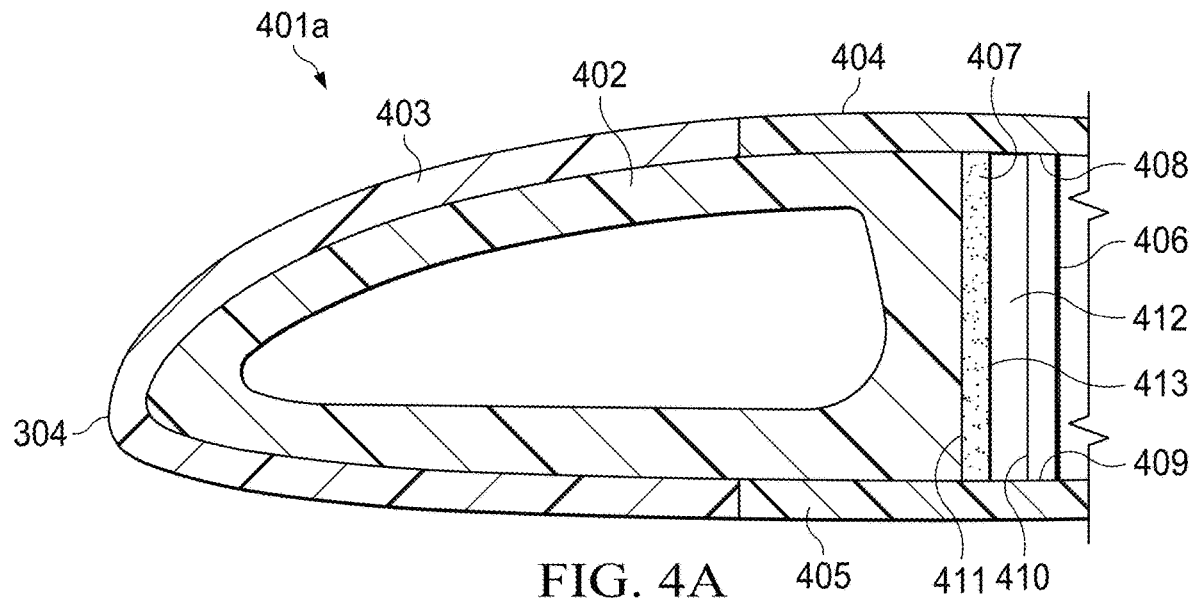

FIG. 4A is a partial cross-sectional view of the rotor blade of FIG. 3 in an unrepaired state.

Figure 4B:
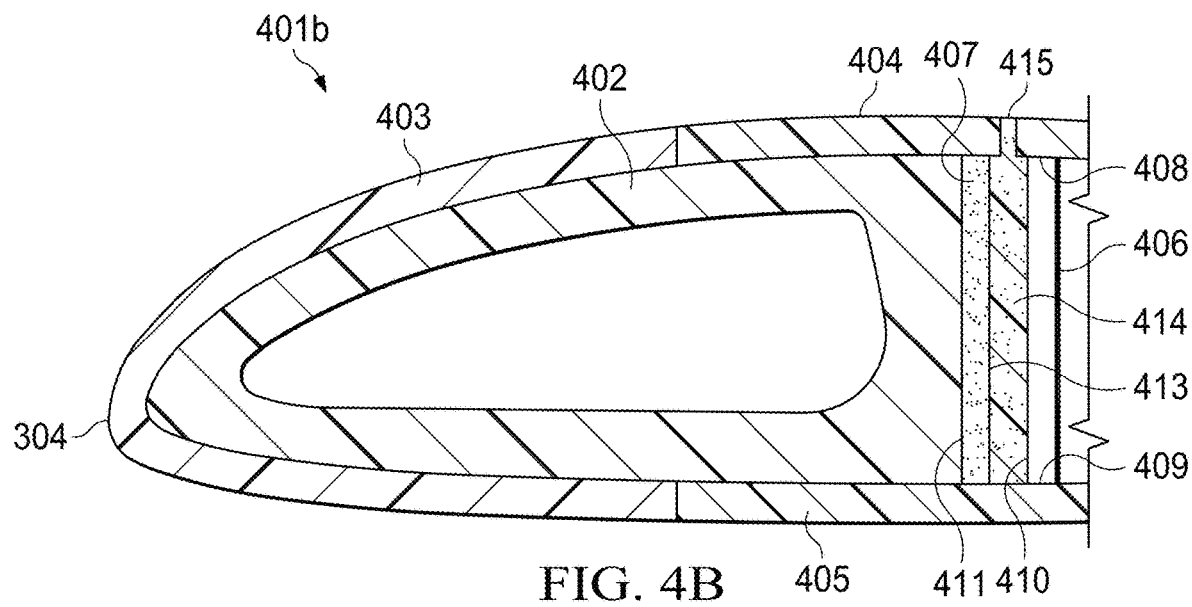

FIG. 4B is a partial cross-sectional view of the rotor blade of FIG. 3 in a substantially repaired state.

FIG. 5 is a schematic diagram of a system for conducting nondestructive evaluation of a composite structure for the purpose of identifying an undesirable void space.

FIG. 6 is a top view of the rotor blade of FIG. 3 with a void location marked on the rotor blade.

FIG. 7 is a top view of the rotor blade of FIG. 6 with masking tape applied around the marked void location.

Figure 8:
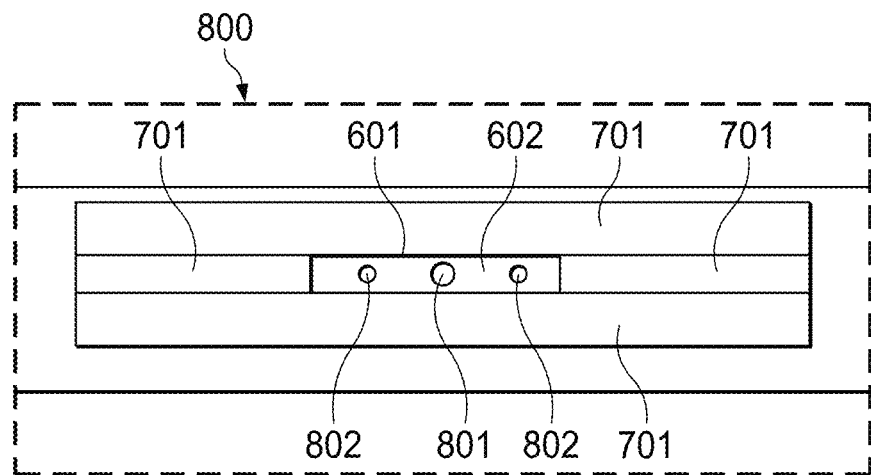

FIG. 8 is a partial top view of the rotor blade of FIG. 7 with an injection hole and two relief holes drilled into the rotor blade.

Figure 9:
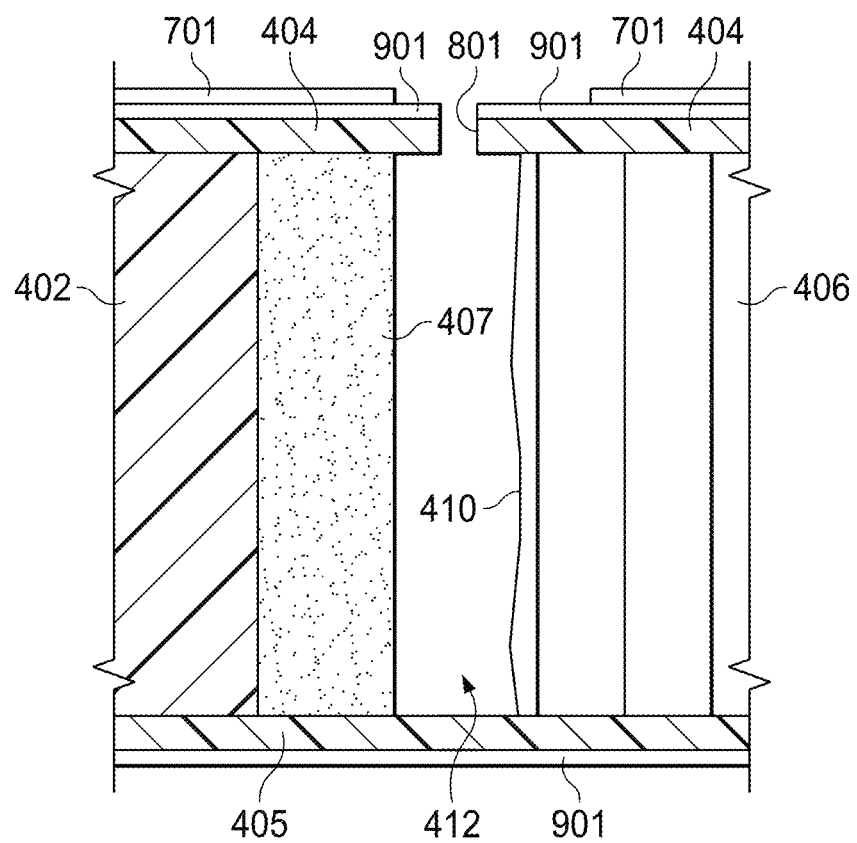

FIG. 9 is a schematic partial cutaway view of the unrepaired rotor blade showing masking tape and paint.

Figure 10:
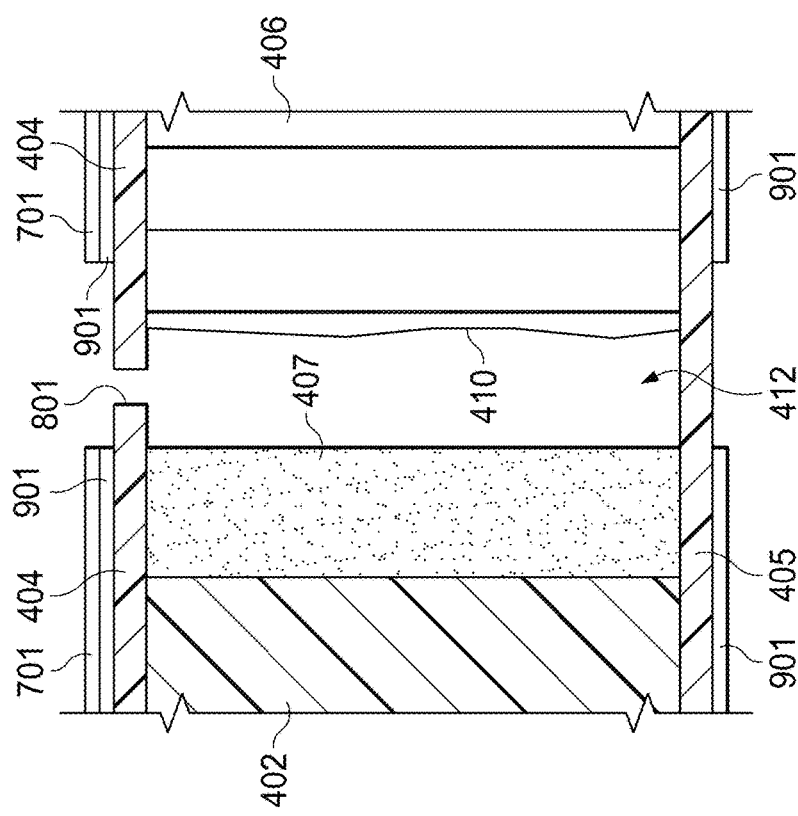

FIG. 10 is a schematic partial cutaway view of the unrepaired rotor blade showing paint removed from both the upper skin and the lower skin.

Figure 11:
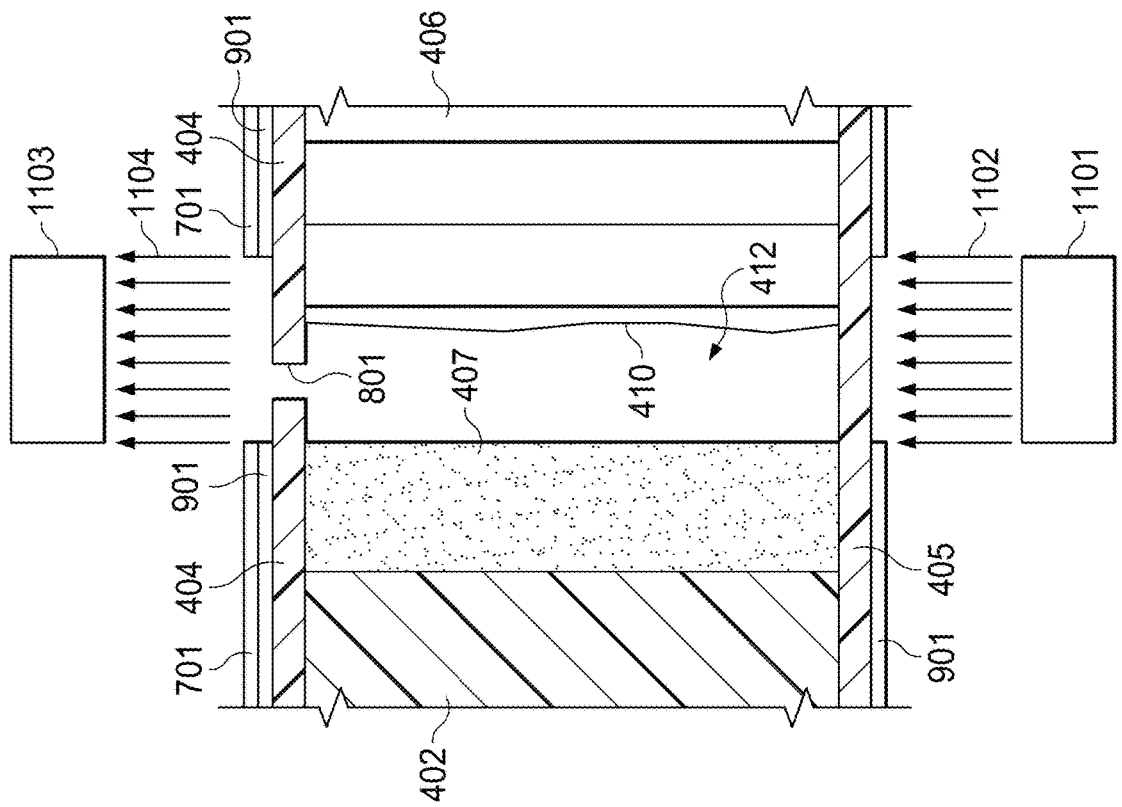

FIG. 11 is a schematic representation of a system for capturing visual images of X-rays or light traveling through an unrepaired void space.

Figure 12:
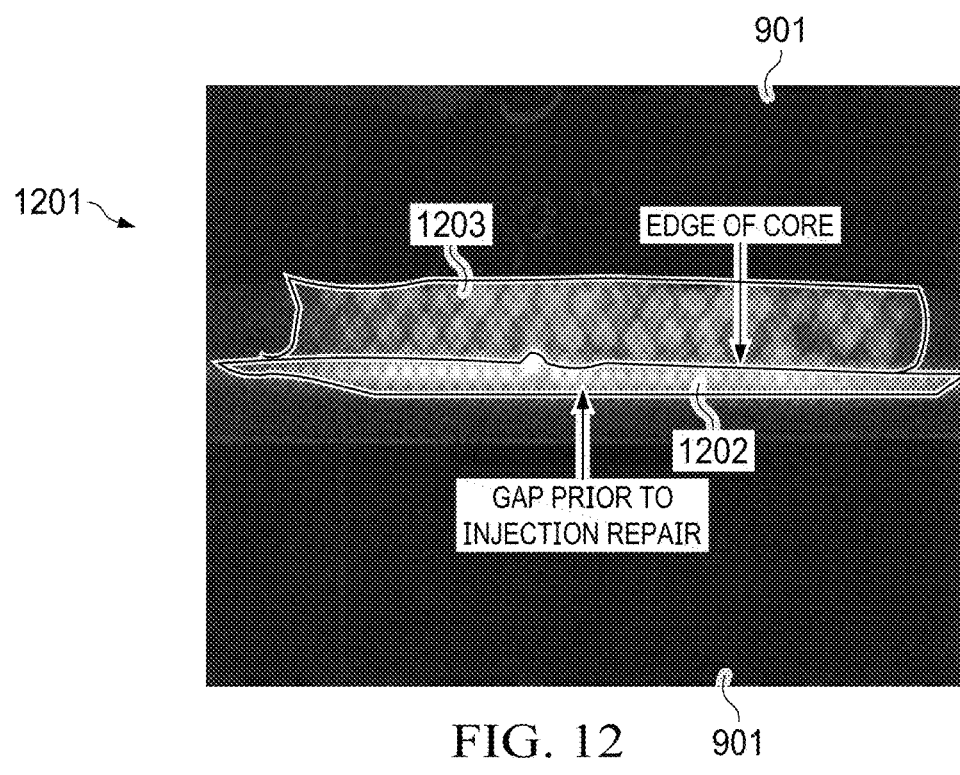

FIG. 12 is a sample captured visual image of an unrepaired void space.

Figure 13:
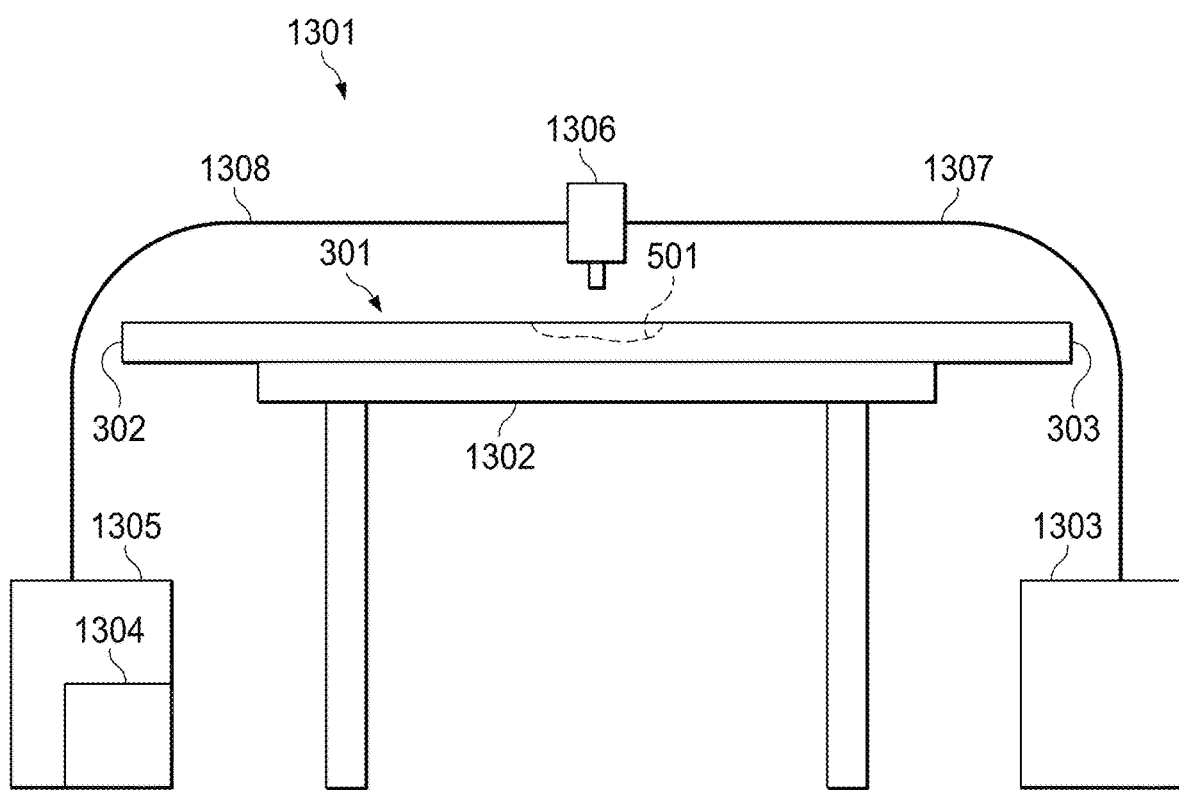

FIG. 13 is a schematic representation of a foam injection system.

Figure 14:
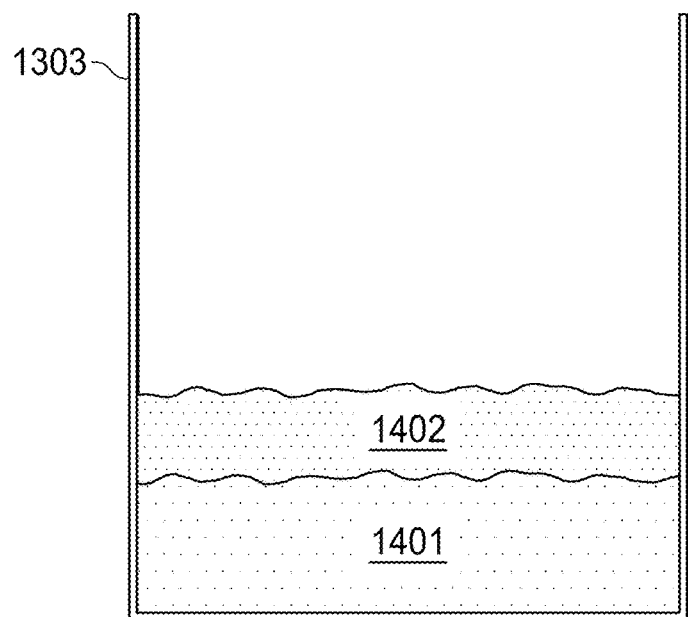

FIG. 14 is a schematic representation of the unmixed constituents of a foam system.

Figure 15:
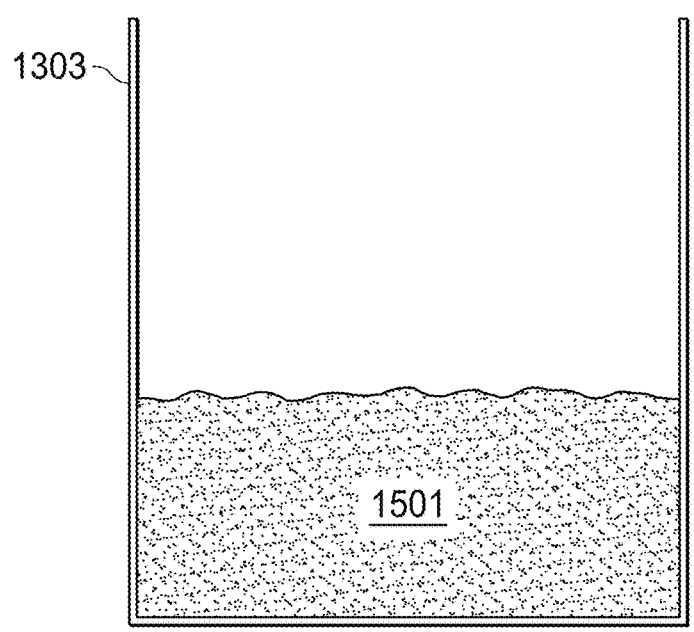

FIG. 15 is a schematic representation of a mixed foam ready for injection.

Figure 16:
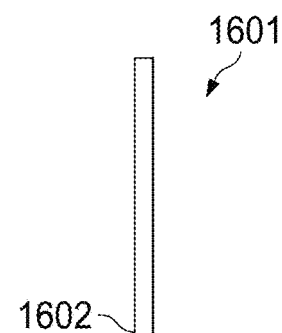

FIG. 16 is mixer for mixing the constituents of FIG. 14.

Figure 17:
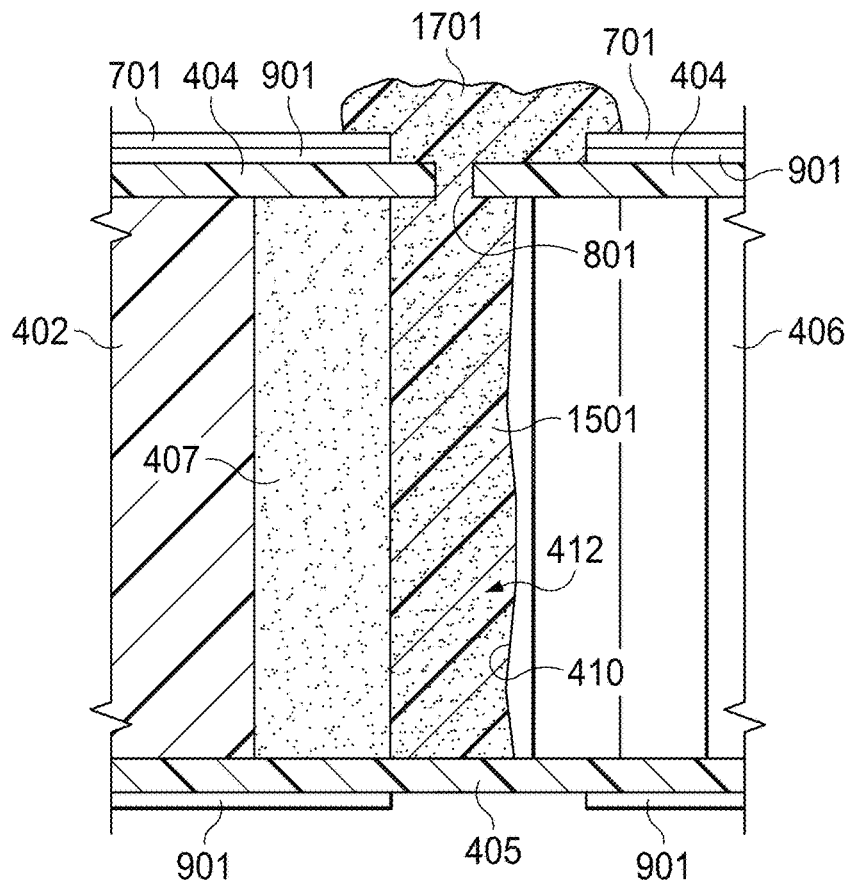

FIG. 17 is a schematic partial cutaway view of the unrepaired rotor blade showing the foam mixture injected into the void space.

Figure 18:
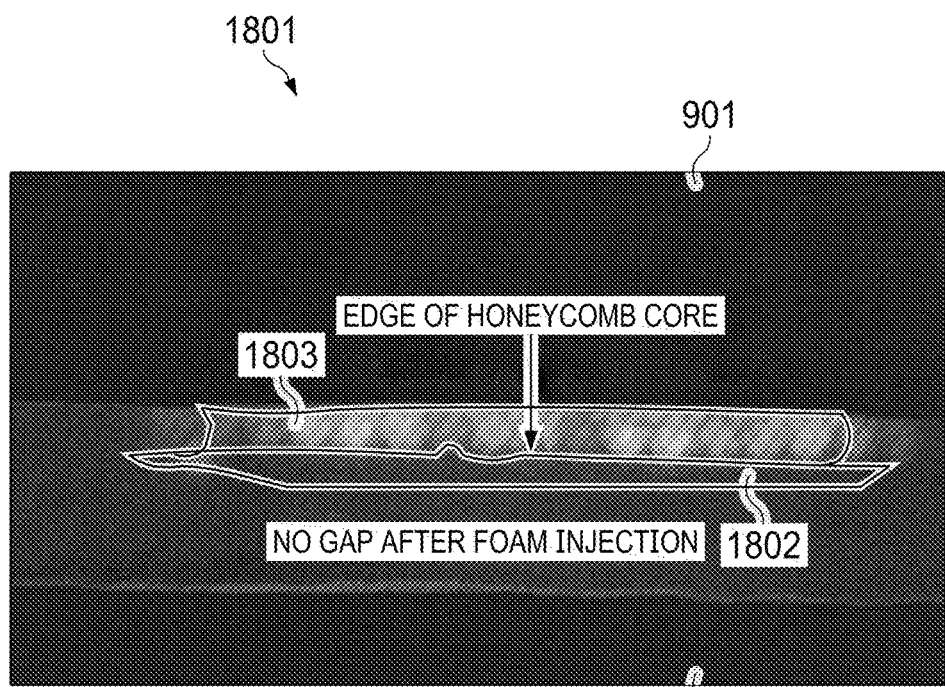

FIG. 18 is a sample captured visual image of a repaired void space.

FIG. 19 is a schematic partial cutaway view of a repaired rotor blade.

FIG. 20 depicts a magnified view of a section of a cured barium sulfate foam mixture as disclosed herein.

FIG. 21 is an expanded view of the highlighted region in FIG. 20.

Figure 22:
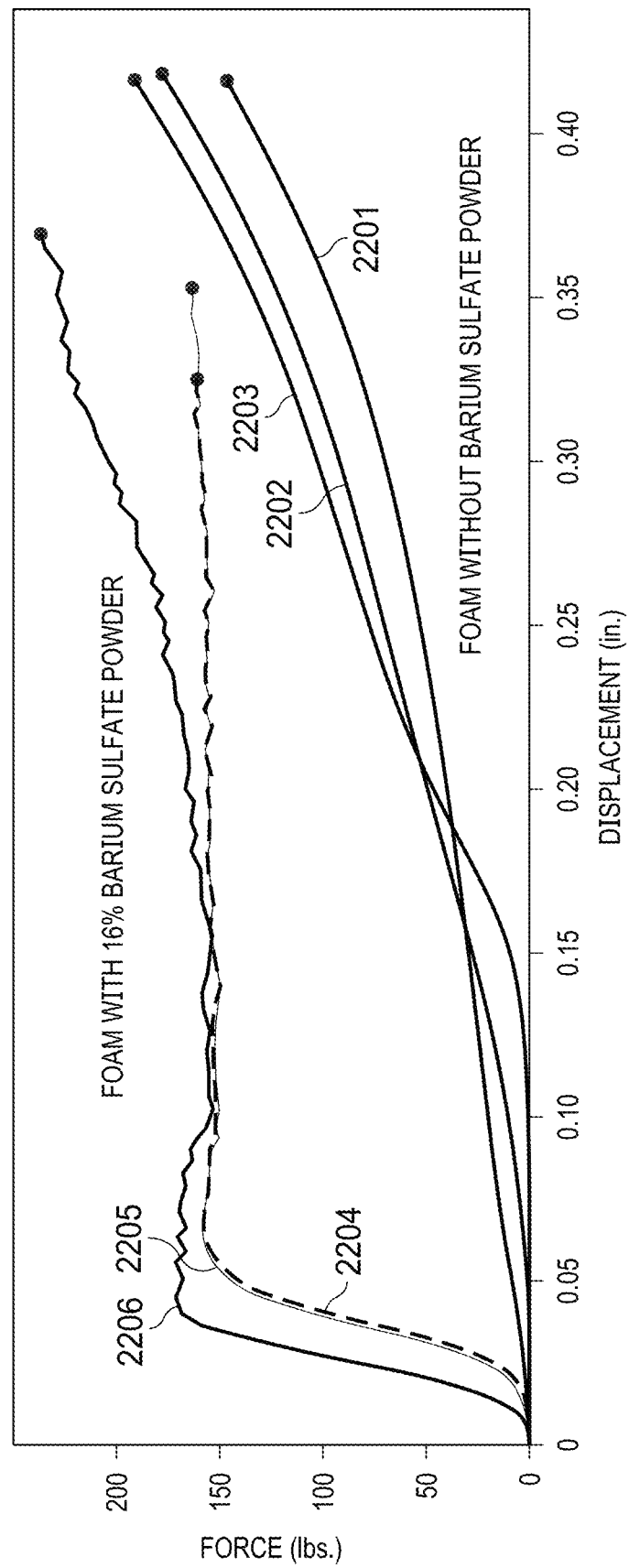
Figure 23:
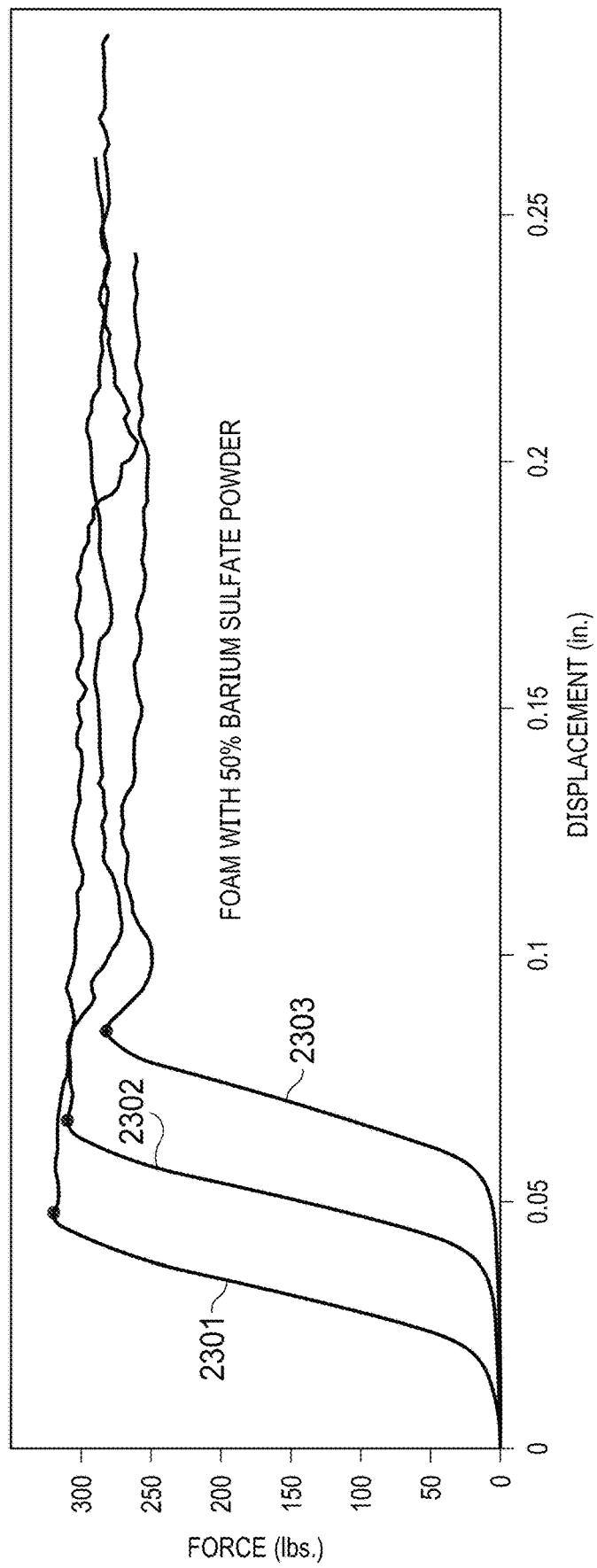

FIGS. 22 and 23 are graphs illustrating the compressibility of the barium sulfate foam mixture across various samples.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring to FIGS. 1A-1C, an example tiltrotor aircraft is schematically illustrated and generally designated 100. Tiltrotor aircraft 100 includes a fuselage 101, wings 102 and tail assembly 103. The wings 102 and tail assembly 103 may include control surfaces, such as ailerons, flaps, slats, spoilers, elevators, rudders, or ruddervators, operable for horizontal and/or vertical stabilization during forward flight. Pylon assemblies 104a, 104b are located at the outboard ends of wing 102 and are rotatable relative to wings 102 between a generally vertical orientation, as best seen in FIG. 1A, and a generally horizontal orientation, as best seen in FIGS. 1B-1C. Pylon assemblies 104a, 104b may comprise a fixed portion that is attached to wing 102 and a moveable portion that rotates or pivots relative to wing 102 as illustrated in FIG. 1A. In other embodiments, the entire pylon assembly 104a, 104b may rotate relative to wing 102.

Pylon assemblies 104a, 104b each house a portion of a drive system that is used to rotate proprotor assemblies 105a, 105b, respectively. The drive system may comprise, for example, a lift engine within fuselage 101 that are coupled to each of the proprotor assemblies 105a, 105b via linkages in wing 102 and pylon assemblies 104a, 104b. Each proprotor assembly 105a, 105b includes a plurality of proprotor blades 106a, 106b that are operable to be rotated, operable to be feathered, and operable to be folded. In other embodiments, pylon assemblies 104a, 104b may comprise engines that are configured to drive respective proprotor assemblies 105a, 105b.

FIG. 1A illustrates tiltrotor aircraft 100 in VTOL or helicopter flight mode, in which pylons 104a, 104b are configured in a vertical position and proprotor blades 106a, 106b rotate in a substantially horizontal plane to provide a lifting thrust, such that tiltrotor aircraft 100 flies much like a conventional helicopter.

FIG. 1B illustrates tiltrotor aircraft 100 in a forward flight mode, in which pylons 104a, 104b have been rotated forward to a horizontal position so that proprotor blades 106a, 106b are rotating in a substantially vertical plane to provide a forward thrust thereby enabling wings 102 to provide a lifting force responsive to forward airspeed, such that tiltrotor aircraft 100 flies much like a conventional propeller driven aircraft.

In addition, it should be appreciated that tiltrotor aircraft 100 can be operated such that proprotor assemblies 105a, 105b are selectively positioned between proprotor forward flight mode and helicopter mode, which can be referred to as a conversion flight mode.

While in the configuration illustrated in FIG. 1B, tiltrotor aircraft 100 may transition between a proprotor-driven forward-flight mode and a thrust-driven forward-flight mode (referred to herein as "jet mode"). The thrust engine may be, for example, turbojet engines 107a, 107b that are mounted on fuselage 101. The thrust engine may be engaged to initially supplement the forward thrust of proprotor assemblies 105a, 105b. The lift engine may then be disengaged from proprotor assemblies 105a, 105b so that the thrust engines 107a, 107b provide all of the forward thrust for tiltrotor aircraft 100. The proprotor blades 106a, 106b on proprotor assemblies 105a, 105b are then feathered (i.e., oriented to be streamlined in the direction of flight).

FIG. 1C illustrates tiltrotor aircraft 100 in airplane forward flight mode, in which proprotor blades 106a, 106b have been folded so that they are oriented substantially parallel to respective pylon assemblies 104a, 104b. This configuration minimizes the drag force generated by proprotor blades 106b, 106c during jet-mode flight. The forward cruising speed of tiltrotor aircraft 100 can be significantly higher in a thrust-driven airplane flight mode versus proprotor flight mode by reducing any airspeed-induced proprotor aeroelastic instability. In this configuration, the thrust engines 107a, 107b provide forward thrust for tiltrotor aircraft 100, thereby enabling wings 102 to provide a lifting force responsive to the forward airspeed.

FIG. 2 illustrates a side view of an example aircraft, which in this example is a rotorcraft 200. Rotorcraft 200 includes a propulsion system 201, a fuselage 202, landing gear 203, a tail rotor or anti-torque system 204, an empennage 205, and a tail structure 206. Anti-torque system 206 may include rotor blades 207. Propulsion system 201 may include one or more engines (not shown) that are mechanically connected to a main rotor gearbox (not shown) to provide torque to a rotor system 208 that includes rotor blades 209 and also to provide torque to anti-torque system 206. The pitch of each rotor blade 209 can be managed or adjusted in order to selectively control direction, thrust, and lift of rotorcraft 200. The fuselage 202 is the main body of the rotorcraft, which may include a cabin (e.g., for crew, passengers, and/or cargo) and/or may house certain mechanical and electrical components (e.g., engine(s), transmission, and/or flight controls). In the illustrated embodiment, tail structure 206 may be used as a horizontal stabilizer.

In some cases, various components of tiltrotor aircraft 100 and/or rotorcraft 200 may be made from composite materials. For example, rotor blades 106a and 106b of tiltrotor aircraft 100 and/or rotor blades 207 and 209 of rotorcraft 200 may be made of composite materials. A composite material is a combination of different materials integrated together to achieve certain structural and/or design properties. For example, the composite material may be a combination of at least two different materials that, when they are in close proximity and function in combination with each other, enhance the capabilities that either material may possess alone. Composite materials can be integrated together to form three-dimensional composite structures, such as rotor blades. The properties of a three-dimensional composite structure are typically superior to the properties of the underlying materials individually. For example, certain composite materials may be lightweight yet relatively strong, rendering them particularly suitable for aircraft and other applications where weight and/or strength are critical to performance. In some cases, components may be made from fiber reinforced composite materials such as carbon fiber reinforced polymers (CFRPs), boron fiber reinforced composites, combinations thereof, or the like.

A pourable foam may be used in composite structures. The pourable foam may be used to create solid, rigid structures that are shaped using a mold and/or by machining cured foam into a desired shape and thickness. Pourable foam may be used in construction and repair of rotors, wing components, fuselage panels, bulkheads, and nose cones, for example. The stiffness of the pourable foam may be tuned without significant increase in foam density by adding barium sulfate powder. The addition of barium sulfate converts a conventional pourable foam into an energy attenuating foam. Such energy attenuating foam is inspectable using typical nondestructive techniques, such as radiographic, ultrasonic, and visual testing.

Adding barium sulfate to a pourable foam improves the foam's impact properties by increasing the homogeneity of the foam mixture and reducing porosity of the cured foam. The improved impact properties for the foam with added barium sulfate make it an ideal application for components at risk for bird strikes, such as rotor blades and nose cones. The addition of barium sulfate powder allows for control of the size of the foam molecules. As the amount of barium powder increases, the size of the foam molecules decreases. The presence of the barium particles restricts foam expansion, which makes the foam mixture more homogeneous and uniform. Since the expansion of foam molecules is restricted due to barium particles, the density of the foam is more consistent. Moreover, the foam is still pourable with the added barium sulfate, which makes manufacturing easier and enables the creation of complex parts.

FIG. 3A is a top view of a rotor blade 301, which is an example aircraft component that can benefit from a pourable foam to which barium sulfate added. Rotor blade 301 includes a root end 302, a tip end 303, a leading edge 303, and a trailing edge 305. FIGS. 3B and 3C are cross-sectional views of a partially unassembled rotor blade 301 (FIG. 3B) and an assembled rotor blade 301 (FIG. 3C). Rotor blade 301 generally includes a lengthwise spar 306, a forward skin 307, an upper skin 308, a lower skin 309, a lightweight cellular structure, such as, but not limited to, a columnar honeycomb structure 310, and an expanding adhesive 311.

In some cases, rotor blade 301 is constructed by producing a leading subassembly 312 comprising at least the spar 306 and the forward skin 307 and separately producing a trailing subassembly 313 comprising at least the upper skin 308, lower skin 309, and the honeycomb structure 310. In such construction methodologies, tolerances of the spar 306, forward skin 307, upper skin 308, and lower skin 309 may be easier to ensure conformity to prescribed dimensions as compared to ensuring conformity of the dimensions of the honeycomb structure 310 to within prescribe tolerances. Further, an upper interface profile 314 and a lower interface profile 315 may be more easily made to conform to prescribed dimensions than a forward interface profile 316 because cutting the honeycomb structure 310 in directions relatively more orthogonal to the columnar directions may benefit from the relatively stiffer response of the honeycomb structure to a cutting device that is simultaneously cutting many cellular columns as opposed to sequentially cutting through individual sidewalls of the cellular columns. In circumstances where dimensions of the honeycomb structure 310 are properly controlled, the rotor blade 301 can generally be constructed by applying the expanding adhesive 311 to a rear face 317 of the spar 306, bringing the forward interface profile 312 of the honeycomb structure 310 into contact with the expanding adhesive 311, and bringing the upper skin 308 and lower skin 309 into abutment or near abutment with each of the forward skin 307 and upper and lower sides of the spar 306, respectively.

In cases where the skins 308 and 309 do not abut the forward skin 307, adhesive or bonding material may be disposed therebetween. Similarly, in cases where the skins 308 and 309 do not abut the spar 306, adhesive or bonding material may be disposed therebetween. Once assembled, the rotor blade 301 may be cured by allowing time to elapse with or without the aid of externally applied heat and/or pressure. Ultimately, a cohesive structure is formed that among other things, utilizes the now hardened expanding adhesive 311 to rigidly bond the spar 306, the upper skin 308, the lower skin 309, and the forward interface profile 316 together into a load bearing force path capable of transmitting shear forces.

Referring now to FIG. 4A, a partial cross-sectional view of a rotor blade 401a prior to being repaired is shown. The rotor blade 401a is substantially similar to rotor blade 301 (FIGS. 3A-C) insofar as it comprises substantially the same components. The rotor blade 401a includes a lengthwise spar 402, a forward skin 403, an upper skin 404, a lower skin 405, a columnar honeycomb structure 406, expanding adhesive 407, upper interface profile 408, lower interface profile 409, forward interface profile 410, and a rear face 411. Although the unrepaired rotor blade 401a comprises substantially the same physical components as rotor blade 301, it also has an undesirable void space 412 located between at least the fully expanded and hardened expanding adhesive 407 and forward interface profile 410 of honeycomb structure 406 that does not conform to the original design requirements of the rotor blade 401a.

The void space 412 can be referred to has comprising a void boundary 413. The presence of the undesirable void space 412 is an example of a manufacturing defect or other failure in rotor blade 401a. Accordingly, at least where the example cross-section is taken, the original design intent of the rotor blade of providing a force path for at least shear forces is not met due to the lack of structural connection between the expanding adhesive 407 and the honeycomb structure 406. It will be appreciated that the void space 412 and the associated void boundary can comprise substantially any shape and extend uniformly or irregularly in all three dimensions up to and including extending to the point of being bounded by the honeycomb structure 406, the expanding adhesive 407, the upper skin 404, the lower skin 405, and/or any longitudinal caps used to enclose the rotor blade 401a at the root end 302 or tip end 303, or any other structure used to encapsulate the void space 412.

Referring now to FIG. 4B, a partial cross-sectional view of a rotor blade 401b after being repaired is shown. The repaired rotor blade 401b is substantially similar to the unrepaired blade 401a, however, rather than the void space 412 comprising no significant amount of material, the void space 412 is now substantially filled with expanded and cured foam 414. Further, an injection hole 415 formed through the upper skin 404 is filled with cured foam 414. The systems and methods for effectuating the shown repair is described in greater detail below.

FIGS. 5-19 illustrate an example process for repairing a composite structure, such a rotor blade 301 (FIG. 3). Most generally, the repair allows a defective composite structure to be remediated and repaired using a foam injection process and without requiring application of patches to the exterior skins of the composite structures. The foam used in the repair has a barium sulfate additive. It will be appreciated that the repair process can be generalized and applied to any other composite structure, such a nose cone, wing, tail structure, or the like, comprising an undesired void space. The presence of such void spaces can undesirably alter an intended force transfer path of the composite structure.

FIG. 5 depicts a rotor blade 301, which is an assembled composite structure. In some cases, the composite structure may be assembled and already in service in the field, such as, but not limited to, a rotor blade 310 that was manufactured with an undesired and unknown void space and then placed into service on a helicopter. In other cases, an assembled composite structure may comprise a composite structure that is completely manufactured and ready for installation and use, but for undergoing a nondestructive evaluation to check for an undesirable void space. In both of the cases, the presence of the void space is likely unknown prior to the nondestructive evaluation. In another case, providing an assembled composite structure may comprise providing a composite structure having a known but undesired void space. Although the void space may have been detected during assembly of the composite structure, the composite structure was not designed to have the void space and assembly was completed anyway, perhaps in anticipation of remediating the composite structure using the systems and methods disclosed herein. In other cases, a composite structure may be provided that is less than fully assembled or completed, but wherein the degree of completion of the assembly makes conventional ways of accessing a void space inefficient or undesirably destructive.

A nondestructive evaluation of the composite structure 301 is performed to identify and locate an existing undesirable void space 501. The composite structure 301 can be imaged or otherwise evaluated using light, X-rays, or other methods. A light or X-ray emitter 502 can emit light or X-ray radiation 503 in a direction toward an electronic receiver 504 (or alternatively, a chemically reactive film). With the rotor blade 301 disposed in the path of the light or X-ray radiation 503, an amount of radiation that passes through the rotor blade 301 is not uniform and any anomalies can be interpreted as representing the approximate size and/or location of any undesired void space 501. The location and amplitude of the light or X-ray radiation 505 received by the electronic receiver 504 can be communicated to a user by computer visualization, printed mappings, audible tones, or any other suitably reliable indicator. Depending on the manner in which the location of the void space 501 is communicated, information regarding the location, size, and boundaries of the void space 501 can be recorded either incrementally or simultaneously as a collective representation. In this embodiment, a void space 501 can reasonably be anticipated to have a gap of anywhere from about 1 mm to about 5 mm (about 0.04 inches to about 0.2 inches) of separation between expanding adhesive 407 and forward interface profile 410 of honeycomb structure 406 (FIG. 4A).

FIG. 6 is a top view of rotor blade 301. Once the location, size, and/or shape of void space 501 has been determined, a representation 601 of the void space 501 is recorded on the outermost surface 602 of rotor blade 301. In one embodiment, the outermost surface 602 of rotor blade 301 comprises paint. Accordingly, in this embodiment, a visual recordation 601 (preferably a visual depiction representative of the size, shape, and location) of the void space 501 is made on the paint of outermost surface 602. In some cases, the visual recordation 601 can be closely matched to the actual dimensions and locations of the void space 501. However, in other embodiments the visual recordation 601 can comprise a generalized boundary intended not only to envelope the void space, but also to include a sufficient amount of adjacent honeycomb structure 406 as to be useful in imaging processes described below. The visual recordation 601 can be made manually, such as with a marker or pencil, or alternatively, by an automated process that utilized information generated by the electronic receiver 504. Regardless of the manner in which the visual recordation 601 is made, the effect is to provide visual guidance to relocating the void space found via the nondestructive evaluation method.

FIG. 7 is a top view of rotor blade 301 after being prepared for repair using a pourable foam having barium sulfate added. A mask or other protective yet removable layer or coating may be applied to the areas of the paint on outmost surface 602 that directly surround the area denoted by visual recordation 601. In some embodiments, the masking can be achieved by applying strips of commercially available masking tape 701 as shown. Once the masking has been accomplished, the repair may continue.

FIG. 8 is detailed view of the region 800 identified in FIG. 7. At least one injection hole 801 is drilled through the paint and upper skin layers of top surface 602 to form a passage between the void space 412 and the space exterior to the rotor blade 301. The diameter of the injection hole 801 should be equal to or less than the maximum allowable diameter hole or defect prescribed as allowable to be repaired for the rotor blade 301 without required the use of a skin patch. In other words, the injection hole 801 diameter should be chosen to be small enough to not require use of a skin patch for the repaired composite structure to be rightfully certified for being placed back into service. It will be appreciated that the maximum allowable diameter holes for some composite structures, such as fuselage composite structures, may allow for larger diameter holes, while other composite structures, such as tail rotor blades, may require smaller holes than a main rotor blade. In this embodiment, a hole size of 2.5 mm (or approximately 0.1 inches) would, according to the appropriate structural repair manual, require use of a skin patch. Accordingly, in this embodiment, an injection hole 801 size of 2.25 mm (or approximately 0.09 inches) is selected as an allowable hole size that does not require use of a skin patch. In some embodiments where the longitudinal length of the void space 412 is determined to be about 15 cm (or approximately 6 inches) or longer, two relief holes 802 are drilled through the paint and upper skin of top surface 602 to form passages between the void space 412 and the space exterior to the rotor blade 301. All injection holes 801 and relief holes 802 should be drilled substantially orthogonally relative to the skin. In some embodiments, the relief holes 802 are located about 6 mm (or approximately 0.25 inches) away from the outermost lateral ends of the void space 412. In some cases where the injection hole diameter is about 2.25 mm, the associated relief holes may be about 1.8 mm (or approximately 0.07 inches) in diameter or less.

FIG. 9 is a partial schematic cutaway side view of rotor blade 301 having an injection hole 801. Once the requisite holes have been drilled, the repair may continue by removing paint 901 from the areas on upper skin 404 as indicated by the visual recordation 601.

Further, as shown in FIG. 10, paint 901 may be removed from the lower skin 405 of the rotor blade 301 sufficient to allow an improved passage of light energy through the void space 412 and adjacent honeycomb structure 406 when light is used for nondestructive imaging. The paint 901 may be removed by commonly known abrasive or chemical techniques.

FIG. 11 depicts a partial schematic cutaway side view of the rotor blade 301 during pre-repair nondestructive imaging of the void space 412. In one embodiment, a bright light, such as a one million candlepower (or alternatively, 32,000 lumens) visible spectrum light source 1101 is placed below the rotor blade 301 generally centered along the area of removed paint 901 of the lower skin 405. Next, light 1102 is emitted from the light source 1101 and is passed through the void space 412 and the honeycomb structure 406. A camera 1103 is placed above the upper skin 404 and is generally centered along the area of removed paint 901 of the upper skin 404 and is aimed to receive light 1104 that has been transmitted through the rotor blade 301. While the light source 1101 is emitting light 1102, the camera 1104 is operated to capture a visual image 1201 (FIG. 12) of the light 1104 that is transmitted through the rotor blade 301.

The visual image 1201 shown in FIG. 12 generally shows a void zone 1202 of brightest or highest intensity light that indicates where a void space 412 is likely to exist. The adjacent honeycomb zone 406 is generally relatively dimmer 1203 than the void zone 1202. This visual image 1201 can be saved for use in determining an effectiveness of the repair process by comparison to a later captured image.

FIG. 13 depicts a foam injection system 1300 according to an example embodiment. The foam injection system 1301 includes a vertical support 1302 (such as a table) configured to support the rotor blade 301 at a convenient working height, a foam supply 1303, an air compressor 1304, a compressed air storage tank 1305, and a foam injection nozzle 1306. A foam supply conduit 1307 connects the foam supply 1303 to the foam injection nozzle 1306, and air supply conduit 1308 connects the compressed air storage tank 1305 to the foam injection nozzle 1306. In this embodiment, the foam supply 1303 can comprise a bucket or other simple unpressurized container adapted for holding a two-part foam with barium sulfate added. In an alternative embodiment, an air gun with an associated cartridge filled with the required amount of foam may be utilized rather than foam injection nozzle 1306 and associated foam supply 1303.

The composite structure being repaired, such as rotor blade 301, is placed on the vertical support 1302 with the injection hole 801 and any relief holes 802 facing upward. Loose debris may be cleaned from the void space 412 by vacuuming. In cases where there are no relief holes 802, a small vacuum nozzle can be inserted into the void space 412 through the injection hole 801. In cases where more than one hole is present, presenting suction to one or more of the holes 801, 802 without inserting anything into the void space 412 may be preferred.

The required foam volume is calculated as a function of one or more dimensions of the void space 412. In some cases, a void space 412 can be assumed to have assumed uniform depths and heights and only a measured longitudinal length is the variable of interest in determining the required foam volume. For example, for a given length of void space 412 a known volume of foam may be needed. In this embodiment, the required foam volume is associated with a corollary value of elapsed foam injection time where the volumetric rate of foam output from the injection nozzle 1306 is known when foam injection nozzle 1306 is operated at a known air pressure. In some cases, the foam injection nozzle 1306 is supplied compressed air at about 90 psi. With such a known air pressure and a known volumetric rate of foam output at the known pressure, an effective estimate of foam volume can be simplified to simply choosing a period of foam injection time for the measured void space 412 length. In some embodiments, for example, a 7.5 cm (or approximately 3 inch) long void space 412 may require only about 0.5 seconds of foam injection. Void spaces 412 with significantly longer lengths may require as long as about 2 seconds of foam injection. In alternative embodiments, a positive displacement pump may be used to introduce higher resolution or different metering of the amount of foam injected.

FIGS. 14-16 illustrate one method for preparing a foam mixture for use in an example embodiment. Preparing the foam mixture comprises providing the two constituents of a polyurethane foam that is self-expanding based on a two-part chemical reaction (not aerobic reaction) with ambient temperature curing without the need for secondarily applied heat. Upon curing (sufficient passage of time), the foam is rigid while having a relatively low density. An example foam is a polyisocyanurate pour foam system marketed under the name of BX 450 by J6 Polymers LLC. It should be fully appreciated that other foams may be used. BX 450 includes two separate resin components, namely a "part A" resin T (polymeric methylene diphenyl diisocyanate, 70% by weight) and a "part B" resin R (polyol blend, 30% by weight). For the three-part foam mixture used with the embodiments disclosed herein, barium sulfate powder is mixed only with the part B (polyol) resin prior to combination with the part A (diisocyanate) resin. The amount of barium sulfate powder that is added depends on amount of stiffness required in the final foam structure after polymerization of the mixture. The three components (part A, part B, and barium sulfate powder) are not mixed together at the same time. It is important that the barium sulfate powder is mixed only with part B (polyol) prior to combination with part A (diisocyanate). Mixing in this order does not allow any reaction to initiate until part A and part B are mixed.

The addition of barium sulfate particles causes the resulting foam structure to have a more consistent density. The particles of barium sulfate powder restrict the expansion of the foam cells thereby making the mixture uniform. Depending on the density desired in the final foam structure, the quantity of barium sulfate powder is calculated and mixed. Table 1 illustrates the size of foam cells in the resulting foam structure that result from example quantities of barium sulfate power.

TABLE 1

| Barium sulfate powder as percentage of total mixture | Foam cell size | Foam cell size (metric) |
|---|---|---|
| No barium sulfate particles | 0.018"-0.025" | 0.457 mm-0.635 mm |
| 16% barium sulfate particles | 0.010"-0.017" | 0.254 mm-0.432 mm |
| 50% barium sulfate particles | 0.006"-0.012" | 0.152 mm-0.305 mm |

Referring to FIG. 14, the desired weight amounts of part A resin 1401 is poured into foam supply 404. The part B resin is combined with the desired amount of barium sulfate powder and then the barium-sulfate-infused part B resin 1402 is poured into foam supply 404. The part A resin 1401 and part B resin with barium sulfate 1402 are mechanically agitated to form a homogenous mixture 1501 (FIG. 15). A mixer 1601 (FIG. 16) is used in rotation in order to mix part A resin 1401 and part B resin with barium sulfate 1402 to form mixture 1501. Mixer 1601 includes a shaft 1602, the shaft 1602 being configured to be driven by a drill motor, or the like. Mixer 1601 may include a plurality of blades located on a first blade disc 1603 and a second blade disc 1604. In some embodiments, mixer 1601 is rotated at 3500 revolutions per minute for 10-15 seconds when mixing part A resin 1401 and part B resin with barium sulfate 1402 to form mixture 1501. Although the above embodiment is described as utilizing the BX 450 foam, in alternative embodiments, any other suitable type of expanding foam may be utilized. In other embodiments, alternative foams can be utilized that expand faster or slower than the BX 450, are heavier or lighter than the BX450 foam, or that have other characteristic differences relative to BX 450 foam without substantially changing the manner in which the foam is introduced to a void space and without substantially changing the effect of allowing the foam to expand and cure within the void space. The final mixture 1501 may be injected using any system or poured into the cavity being repaired.

In one embodiment, a foam injection system 1301 (FIG. 13) may be used to inject the foam mixture 1501 into void space 412 through injection hole 801. In some cases, the foam mixture 1501 must be injected within about 15-30 seconds of having been completely mixed. In cases where relief holes 802 are not provided, a prescribed volume of foam mixture 1501 can be injected by injecting foam mixture 1501 for a prescribed period of time or by incrementally injecting known amounts of foam mixture 1501, such as by using a positive displacement pump. In some cases, once the required amount of foam mixture 1501 is injected, the injection hole 801 may be covered (e.g., using a plug) to provide force for the foam to fill the void space 412 while traveling the length of the void space 412. In cases where relief holes 802 are provided, either the time or metering methods above can be used, or alternatively, foam mixture 1501 may be injected until foam mixture 1501 reaches one or more of the relief holes 802. The relief holes 802 may remain closed using plugs until the foam mixture 1501 reaches one or more of the relief holes 802. Maintaining the closed relief holes 802 helps to ensure that the foam mixture 1501 remains under a known pressure while being injected and allows an opportunity for a more uniform foam density throughout the length of the foam filled void space 412.

When the relief holes 802 are uncovered, the foam mixture 1501 can expand a rate unimpeded by a pressure blockage. As the foam expands, it can not only fill the known void space 412 but can also self-route to unknown, undetected, or irregular-shaped void spaces that are connected by small passages. In this manner, the solution of filling a void space 412 with expanding foam is, in some embodiments, more robust than can be estimated by the above-described imaging of the void space 412. Any foam mixture 1501 that is not accepted into void space is ultimately ejected out of holes 801 and 802 so that the extraneous foam mixture 1501 is in contact with the upper skin 404, paint 901, and masking tape 701 as shown in FIG. 17. By allowing the excess foam mixture 1501 to exit through the holes 801 and 802, undesirable pressure buildup is also prevented. Undesirable pressure buildup can lead to undesirable increases or inconsistencies in foam density and may apply sufficient pressure to the honeycomb structure 406, upper skin 404, and lower skin 405 to separate the honeycomb structure 406 from either of the skins 404, 405 or the expanding adhesive 407.

The expansion rate of the foam mixture 1501 is a known rate specified by the manufacturer of the foam system. Once the injected foam mixture 1501 has fully expanded or reacted over time, clearly copious amounts of expanded foam 1701 can be removed from the masking tape 701 and some of the expanded foam mixture 1701 can be removed from above the paint 901 level associated with the upper skin 404 while leaving at least a slight bump of expanded foam mixture 420 extending from the holes 801 and 802. By allowing a sufficient duration of time to pass, full curing of the foam mixture 1501 will occur. The curing rate of the foam mixture 1501 is a known rate specified by the manufacturer of the foam system. Total curing time may be between about 15 to about 20 minutes. Once the foam mixture 1501 is completely cured, the foam mixture 1501 is hard and machinable. The bump 1701 of expanded foam mixture 1501 can be cut, ground, or otherwise machined to conform to the general profile of the upper skin 404.

A post-repair nondestructive imaging of the void space 412 may be conducted in substantially the same manner the pre-repair nondestructive imaging is described as being conducted with regard to FIG. 11. The post-repair nondestructive image of the void space 412 is shown in FIG. 18. The post-repair nondestructive imaging of the void space 412 results in a captured visual image 1801 comprising void zone 1802 and an adjacent honeycomb zone 1803. Comparing the post-repair captured visual image 1801 to the pre-repair captured visual image 1201, the void zone 1802 is now much dimmer if not fully opaque as compared to the void zone 1202, which is due to less light or X-rays passing through the void space 412. However, the honeycomb zone 1803 is substantially the same brightness as the honeycomb zone 1203, indicating no change in material content of the honeycomb structure 406. With the void space 412 being confirmed as having been filled completely with cured expanded foam mixture 1501, the repair of rotor blade 301 can be completed.

FIG. 19 depicts rotor blade 301 after paint 901 has been repaired back to a uniform finish. In other words, sanding, and/or chemical preparation of the existing paint 901 can be performed and made ready to accept new paint 1901. New paint 1901 can then be applied to return the outermost surface of the rotor blade 301 to a smooth continuously painted surface and all masking tape 701 can be removed as shown in FIG. 19. With the paint 190, 1910 fully repaired, the rotor blade 301 can be mechanically tested or put directly into service again.

In some embodiments, such as in the case of rotor blades, weight and balance of a repaired rotor blade are important so that low weight and minimal impact to designed balance is desirable. By managing the foam injection and expansion process to minimize density gradients of cured foam, weight and balance impact can be minimized. In some cases, multiple injection holes may be utilized for a single void space. In some cases, a single composite component can comprise multiple unconnected void spaces and the methods disclosed herein can be applied multiple times to achieve repair of the composite structure by filling multiple disconnected void spaces sequentially or simultaneously. In alternative embodiments, thermography and/or ultrasonic systems and methods may be used in addition to or instead of the X-ray and visible light imaging systems described above. While the embodiments described above in great detail discuss drilling through upper skins, in alternative embodiments, void spaces can be made accessible by drilling through any other skin or enclosing material. Further, while relief holes are described as being drilled through the same skins as related injection holes, injection holes and relief holes associated with a void space can be provided through any skin or enclosing material and need not be on the same sides of a composite structure. In some cases, imaging markers such as X-ray opaque material or radioactive material may be mixed with the foam to enable different nondestructive evaluation capabilities.

In alternative embodiments, the skins and/or honeycomb structure of composite structures to be repaired may be formed of metal. In such cases, the methods disclosed herein, with the exception of some of the nondestructive evaluations relying on light being passed through the skins and/or honeycomb structures, can be utilized in substantially the same manner as in cases where the skins and/or honeycomb structures are constructed of materials that are relatively more light permeable.

It will be understood that the repair of enclosed spaces within composite structures is just one use of a foam comprising a two-part resin combined with barium sulfate powder as disclosed herein. In other applications, the foam with barium sulfate added may be poured into molds or blocks and then machined into a desired shape. For example, aircraft components, such as an aircraft fuselage, main rotor, tail rotor, propeller, ducted fan blade or propeller, wing, nose cone, or seat and the like, may be created by pouring the barium sulfate foam mixture 1501 into a mold having a desired shape. Alternatively, the barium sulfate foam mixture 1501 may be used to create blocks of foam that are then machined to a desired shape. Such components, whether molded or machined would also provide the advantages of the barium sulfate foam mixture 1501 disclosed herein. Namely, such components would provide shock absorbing capabilities due to improved compressive strength.

FIG. 20 depicts a magnified view of a section 2001 of a cured barium sulfate foam mixture as disclosed herein. The mixture is a pourable closed cell foam that creates many cells 2002 of different sizes when cured. The inclusion of barium sulfate power into the two-part foam limits the size of the cells 2002. As the amount of barium sulfate powder used is increased, the cell size decreases as shown in Table 1.

FIG. 21 is an expanded view of the highlighted region in FIG. 20. The size of cell 2101 in the cured foam is limited by the number of barium sulfate particles 2102 included in the foam mixture. A larger cell 2101 is weaker because they allow the foam to deflect more. As cell 2101 gets smaller, it also gets stronger because it cannot be deflected as much. The barium sulfate powder creates a more consistent density in the cured foam and can increase the compressive strength so that the foam will return to its original shape after an impact, such as a bird strike on an aircraft component.

FIGS. 22 and 23 are graphs 2200 and 2300 illustrating the compressibility of the barium sulfate foam mixture across various samples. Curves 2201-2203 represent samples of a two-part pourable foam with no barium sulfate powder added. As illustrated in graph 2200, when no barium sulfate powder is added to the foam, relatively small amounts of force cause displacement or compression of the foam. Curves 2204-2206 represent samples of a two-part pourable foam having 16% barium sulfate powder. As illustrated in graph 2200, when the foam is 16% barium sulfate powder, the foam resists compression. Significantly more force is needed to compress foam having 16% barium sulfate powder compared to foam having no barium sulfate powder. For example, to achieve 0.25 inches of compression, only 50 to 75 pounds of force is required for foam having no barium sulfate powder; however, approximately 150 pounds of force is required for foam having 16% barium sulfate powder. Similarly, as shown in graph 2300, even force is needed to compress foam having 50% barium sulfate powder. For example, to achieve 0.25 inches of compression, approximately 250 to 280 pounds of force is required for foam having 50% barium sulfate powder.

With reference to FIGS. 22 and 23, the energy absorption of the foam can be increased when barium sulfate particles are added to the foam because the stroking distance (e.g. distance over which a load is carried) may be increased. Thus, the integrated area under the load-deflection curves 2204-2206 and 2301-2303 can be increased relative to the case where the foam does not include barium sulfate particles as shown in curves 2201-2203.

An impact resistant aircraft component may comprise, for example, a composite structure having a void region and an energy-attenuating or energy-absorbing foam substantially filling the void region. The energy attenuating foam comprises a first resin component, a second resin component, and a barium sulfate component. The energy attenuating properties of the foam are controlled by the proportion of the barium sulfate component in the foam. The energy attenuating foam may be a pourable foam or an injectable foam that expands to fill the void region. The aircraft component may be, for example, an aircraft fuselage, main rotor, tail rotor, propeller, ducted fan blade or propeller, wing, an aircraft nose cone, and an aircraft seat.

The percentage of the barium sulfate component within the energy attenuating foam determines the porosity of the energy attenuating foam. The percentage of the barium sulfate component within the energy attenuating foam also determines the homogeneousness of the energy attenuating foam. Further, the percentage of the barium sulfate component within the energy attenuating foam determines the foam cell size within the energy attenuating foam. The cell size determines the energy-attenuating or energy-absorbing properties of the foam. The cell size and the attenuating properties are related. As the foam cell size decreases, the energy-attenuating properties increase.

The cell size of the foam may be controlled by the proportions of barium sulfate. The proportion of the barium sulfate component relative to the resin components in the energy attenuating foam is selected to create a desired foam cell size. For example, using 16% barium sulfate particles results in cell sizes in the range of 0.010 to 0.017 inches, while using 50% barium sulfate particles results in cell sizes in the range of 0.006 to 0.012 inches.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A component, comprising:
   a composite structure disposed between an upper skin and a lower skin;
   a void region between the upper skin and the lower skin; and
   an energy attenuating foam substantially filling the void region, the energy attenuating foam comprising a first resin component, a second resin component, and a barium sulfate component, wherein energy attenuating properties of the foam are controlled by a proportion of the barium sulfate component in the foam selected to create a foam cell size in the range of 0.006 to 0.017 inches.

2. The component of claim 1, wherein the energy attenuating foam comprises a pourable foam that expands to fill the void region.

3. The component of claim 1, wherein the energy attenuating foam comprises an injectable foam that expands to fill the void region.

4. The component of claim 1, wherein a percentage of the barium sulfate component within the energy attenuating foam determines a porosity of the energy attenuating foam.

5. The component of claim 1, wherein a percentage of the barium sulfate component within the energy attenuating foam determines a homogeneousness of the energy attenuating foam.

6. The component of claim 1, wherein a percentage of the barium sulfate component within the energy attenuating foam determines a foam cell size within the energy attenuating foam, and wherein the cell size determines the energy attenuating properties of the foam.

7. The component of claim 1, wherein the proportion of the barium sulfate component in the energy attenuating foam is selected to create a foam cell size in the range of 0.010 to 0.017 inches.

8. The component of claim 1, wherein the proportion of the barium sulfate component in the energy attenuating foam is selected to create a foam cell size in the range of 0.006 to 0.012 inches.

9. The component of claim 1, wherein the component is an aircraft part.

10. The component of claim 9, wherein the aircraft part is one or more of an aircraft fuselage, main rotor, tail rotor, propeller, ducted fan blade or propeller, wing, an aircraft nose cone, and an aircraft seat.

11. The component of claim 1, wherein the barium sulfate component is combined with the second resin component prior to combining the first and second resin components.

12. The component of claim 1, wherein the barium sulfate component comprises between 10% and 20% of the energy attenuating foam or between 45% and 55% of the energy attenuating foam.

13. The component of claim 1, wherein the energy attenuating foam is deposited in the void region and allowed to cure in the void region.

14. The component of claim 1, wherein the energy attenuating foam is deposited in a mold, allowed to form a blank shape in the mold, the blank shape is machined into a shape to substantially fill the void region.

15. A method for providing a component, the method comprising:
preparing a pourable foam, comprising:
combining a barium sulfate powder component with a first resin component;
controlling energy attenuating properties of the pourable foam by selecting a proportion of the barium sulfate component in the foam to create a foam cell size in the range of 0.006 to 0.017 inches; and
mixing the combination of the first resin component and the barium sulfate powder with a second resin component to create the pourable foam;
depositing the pourable foam in a void region between an upper skin and a lower skin of a composite component; and
allowing the pourable foam to cure in the void region.

16. The method of claim 15, wherein the barium sulfate component comprises between 10% and 20% of the pourable foam or between 45% and 55% of the pourable foam.

17. The method of claim 15 wherein the component is one or more of an aircraft fuselage, main rotor, tail rotor, propeller, ducted fan blade or propeller, wing, an aircraft nose cone, and an aircraft seat.

18. A method for providing a component, the method comprising:
preparing a pourable foam, comprising:
combining a barium sulfate powder component with a first resin component;
controlling energy attenuating properties of the pourable foam by selecting a proportion of the barium sulfate component in the foam to create a foam cell size in the range of 0.006 to 0.017 inches; and
mixing the combination of the first resin component and the barium sulfate powder with a second resin component to create the pourable foam;
depositing the pourable foam in a mold;
allowing the pourable foam to form a blank shape in the mold; and
machining the blank shape into a shape to substantially fill a void region between an upper skin and a lower skin of a composite component.

19. The method of claim 18, wherein the barium sulfate component comprises between 10% and 20% of the energy attenuating foam or between 45% and 55% of the pourable foam.

20. The method of claim 18, wherein the component is one or more of an aircraft fuselage, main rotor, tail rotor, propeller, ducted fan blade or propeller, wing, an aircraft nose cone, and an aircraft seat.

* * * * *